(12) United States Patent
Emsenhuber

(10) Patent No.: US 10,158,285 B2
(45) Date of Patent: Dec. 18, 2018

(54) CIRCUIT AND METHOD FOR OPERATING THE CIRCUIT

(71) Applicant: Infineon Technologies AG, Neubiberg (DE)

(72) Inventor: Matthias Emsenhuber, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/622,180

(22) Filed: Jun. 14, 2017

(65) Prior Publication Data

US 2017/0366083 A1 Dec. 21, 2017

(30) Foreign Application Priority Data

Jun. 16, 2016 (DE) .................... 10 2016 111 036

(51) Int. Cl.
| | |
|---|---|
| *H02M 3/06* | (2006.01) |
| *H02M 1/08* | (2006.01) |
| *H02M 3/07* | (2006.01) |
| *H02M 7/217* | (2006.01) |
| *H02M 7/537* | (2006.01) |
| *H02M 1/088* | (2006.01) |

(52) U.S. Cl.
CPC .............. *H02M 3/06* (2013.01); *H02M 1/08* (2013.01); *H02M 3/07* (2013.01); *H02M 7/217* (2013.01); *H02M 7/537* (2013.01); *H02M 1/088* (2013.01)

(58) Field of Classification Search
CPC ............ H02M 1/08; H02M 3/06; H02M 3/07; H02M 7/217; H02M 7/537; H02M 1/088

USPC .......... 363/62, 65, 67–69; 327/427; 330/295
See application file for complete search history.

(56) References Cited

U.S. PATENT DOCUMENTS

| | | | |
|---|---|---|---|
| 4,317,055 A * | 2/1982 | Yoshida | H03F 1/22 327/541 |
| 4,918,394 A | 4/1990 | Modafferi | |
| 6,320,414 B1 | 11/2001 | Annema et al. | |
| 6,606,130 B1 | 8/2003 | George | |
| 8,072,722 B1 | 12/2011 | Hwang | |
| 8,461,903 B1 * | 6/2013 | Granger-Jones | H03K 17/04 327/427 |
| 2010/0271135 A1 | 10/2010 | Afsahi et al. | |
| 2011/0181364 A1 | 7/2011 | Ahadian et al. | |
| 2014/0002192 A1 | 1/2014 | Seebacher et al. | |
| 2014/0043102 A1 * | 2/2014 | Su | H03F 1/223 330/295 |
| 2014/0118053 A1 * | 5/2014 | Matsuno | H03K 17/693 327/427 |
| 2015/0097624 A1 | 4/2015 | Olson et al. | |

* cited by examiner

*Primary Examiner* — Yemane Mehari
(74) *Attorney, Agent, or Firm* — Viering, Jentschura & Partner mbB

(57) ABSTRACT

In various embodiments, a circuit is provided. The circuit may include a plurality of cascode stages connected in series with one another, a voltage divider which is connected in parallel with the plurality of cascode stages and is coupled to the cascode stages in order to make available a first electrical backup potential at least one cascode stage of the plurality of cascode stages, and a controller which is configured to couple the at least one cascode stage of the plurality of cascode stages to a predefined second electrical backup potential if a voltage which is present at the voltage divider satisfies a predefined criterion.

20 Claims, 30 Drawing Sheets

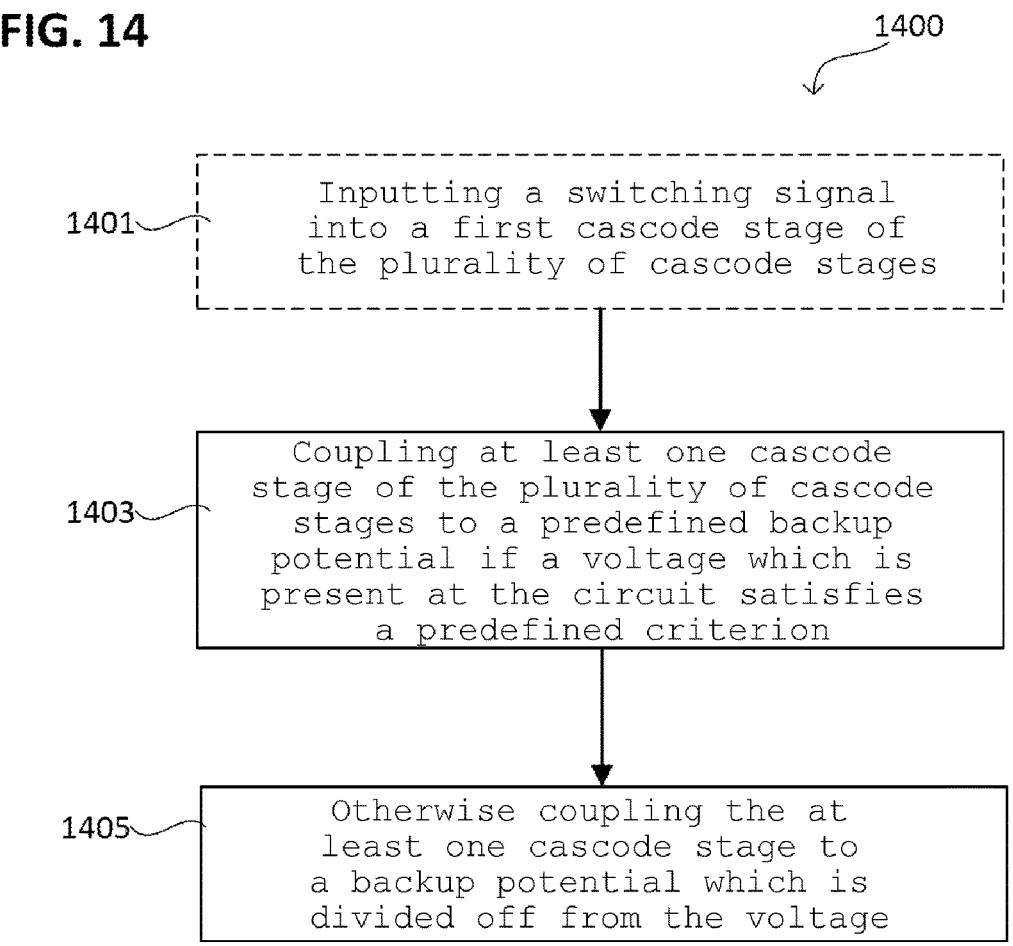

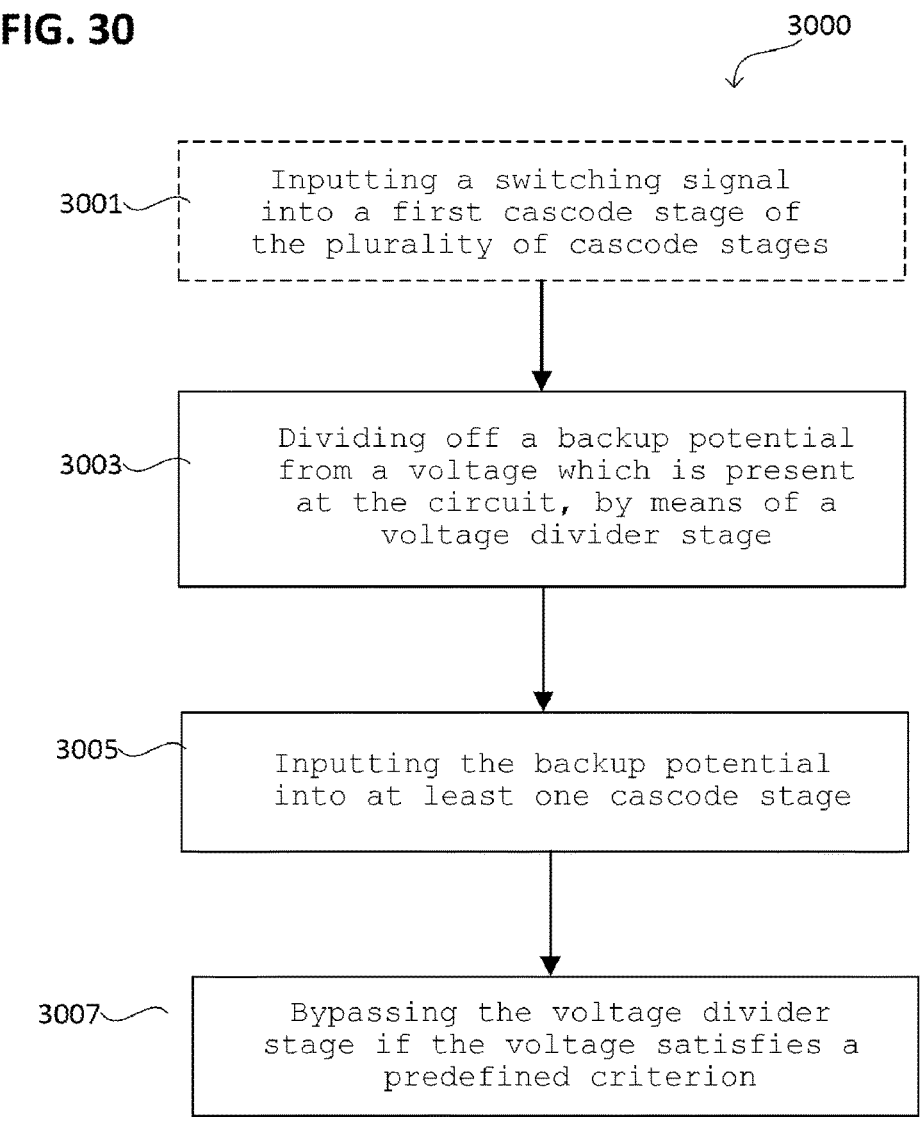

CIRCUIT AND METHOD FOR OPERATING THE CIRCUIT

CROSS-REFERENCE TO RELATED APPLICATION

This application claims priority to German Patent Application Serial No. 10 2016 111 036.1, which was filed Jun. 16, 2016, and is incorporated herein by reference in its entirety.

TECHNICAL FIELD

Various embodiments relate generally to a circuit and to a method for operating the circuit.

BACKGROUND

In general, an integrated circuit (also referred to as a chip or microchip) can be used to process digital or analogue signals. An integrated circuit may include a plurality of electrical components whose electrical circuitry is configured according to one or more functions of the integrated circuit. For example, by means of the electrical components of an integrated circuit signals can be processed or switching operations can be carried out. Certain fields of use may make it necessary to use an integrated circuit to process electrical voltages or signals which exceed the electrical loading capacity (e.g. breakdown voltage) of the individual electrical components. Alternatively or additionally, miniaturization of the electrical components can bring about a reduction in their electrical loading capacity, with the result that the maximum voltage with which the integrated circuit can be operated is reduced. The increasing tendency in the field of electronic circuits of promoting the miniaturization of said circuits can bring about a situation in which the electrical components can no longer satisfy the requirements which are made of the electrical loading capacity with increasing miniaturization. This can be compensated only by modifying the electrical components, e.g. by means of additional masks, which increases the production costs.

Conventionally, it is possible to use what is referred to as a cascode circuit (not to be confused with a cascade) in which a plurality of electrical switches divide the electrical load (cf. FIG. 1), e.g. a plurality of transistors M1, M2, M3. The cascode circuit can be regulated by means of a switch S1, with the result that said cascode circuit is kept operational as far as possible independently of the input voltage Vin (also referred to as an active cascode circuit). The active cascode circuit requires an additional auxiliary voltage VDDnom in order to permit switching above the threshold voltage Vth. If the drain terminal voltage of M3 is lower than VDDnom−Vth, S1 can be switched to a conductive stage and the gate terminal of M3 can be connected to VDDnom, with the result that M3 is kept operational. For voltages higher than VDDnom+Vth, S2 can be in the conductive state and M3 can be operated as a diode. However, owing to an absence of overdriving, a diode does not have low impedance, for which reason large resistive losses have to be accepted. In addition, the cascode circuit has a switching gap between VDDnom−Vth and VDDnom+Vth in which, e.g. if the drain terminal of M3 is connected to VDDnom, none of the two switches S1 and S2 is closed, with the result that the gate terminal of M3 is floating. In addition, the active controller S1, S2 increases the complexity of the cascode circuit if the number of cascode stages is increased, with the result that said circuit is no longer practical. Therefore, the maximum voltage Vin which can be switched by means of the cascode circuit in an economical way is limited.

A passive cascode circuit (cf. FIG. 2) uses a voltage divider R1, R2, R3, R4, R5 for switching the transistors. The voltage present at the transistors M1, M2, M3, M4, M5 is made available in a passive fashion, i.e. is divided off from the input voltage Vin by means of the voltage divider. By means of the passive cascode circuit it is then possible to dispense with the additional supply voltage VDDnom, which simplifies the design. Therefore, further transistors can be added to the passive cascode circuit without having to change their design. Therefore, the passive cascode circuit can be implemented with less expenditure and significantly more transistors M1, M2, M3, M4, M5 than the active cascode circuit, for which reason the passive cascode circuit is suitable, in particular, for high voltages. However, large values for the gate-source voltage and the gate-drain voltage have to be accepted, which increases the required loading capacity of the transistors M1, M2, M3, M4, M5.

The active cascode circuit is conventionally used if a high level of reliability is significant. In contrast to this, the passive cascode circuit is used if a high voltage to be switched is significant.

SUMMARY

In various embodiments, a circuit is provided. The circuit may include a plurality of cascode stages connected in series with one another, a voltage divider which is connected in parallel with the plurality of cascode stages and is coupled to the cascode stages in order to make available a first electrical backup potential at least one cascode stage of the plurality of cascode stages, and a controller which is configured to couple the at least one cascode stage of the plurality of cascode stages to a predefined second electrical backup potential if a voltage which is present at the voltage divider satisfies a predefined criterion.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 14 shows a method according to various embodiments in a schematic flowchart;

FIG. 30 shows a method according to various embodiments in a schematic flowchart.

DESCRIPTION

Figure 1:
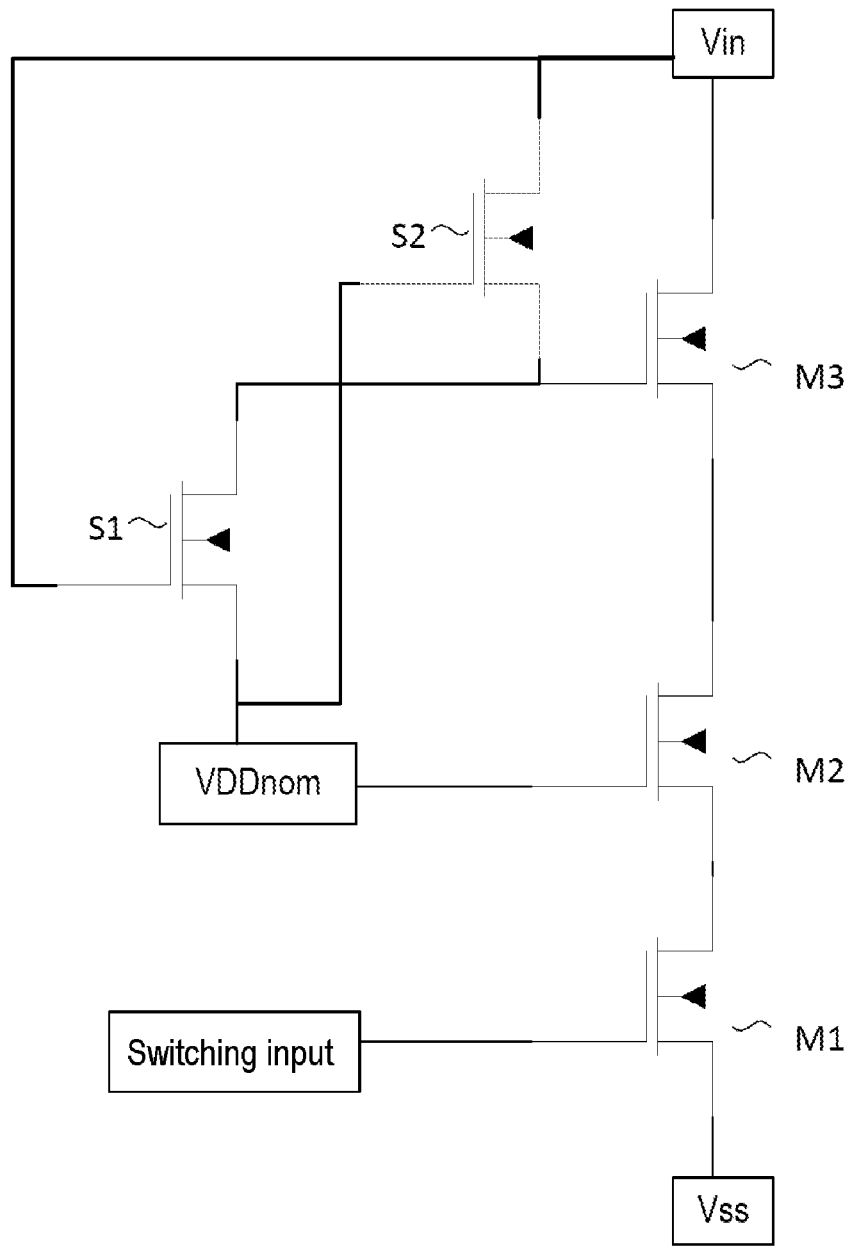
FIG. 1 shows a conventional circuit.
Figure 2:
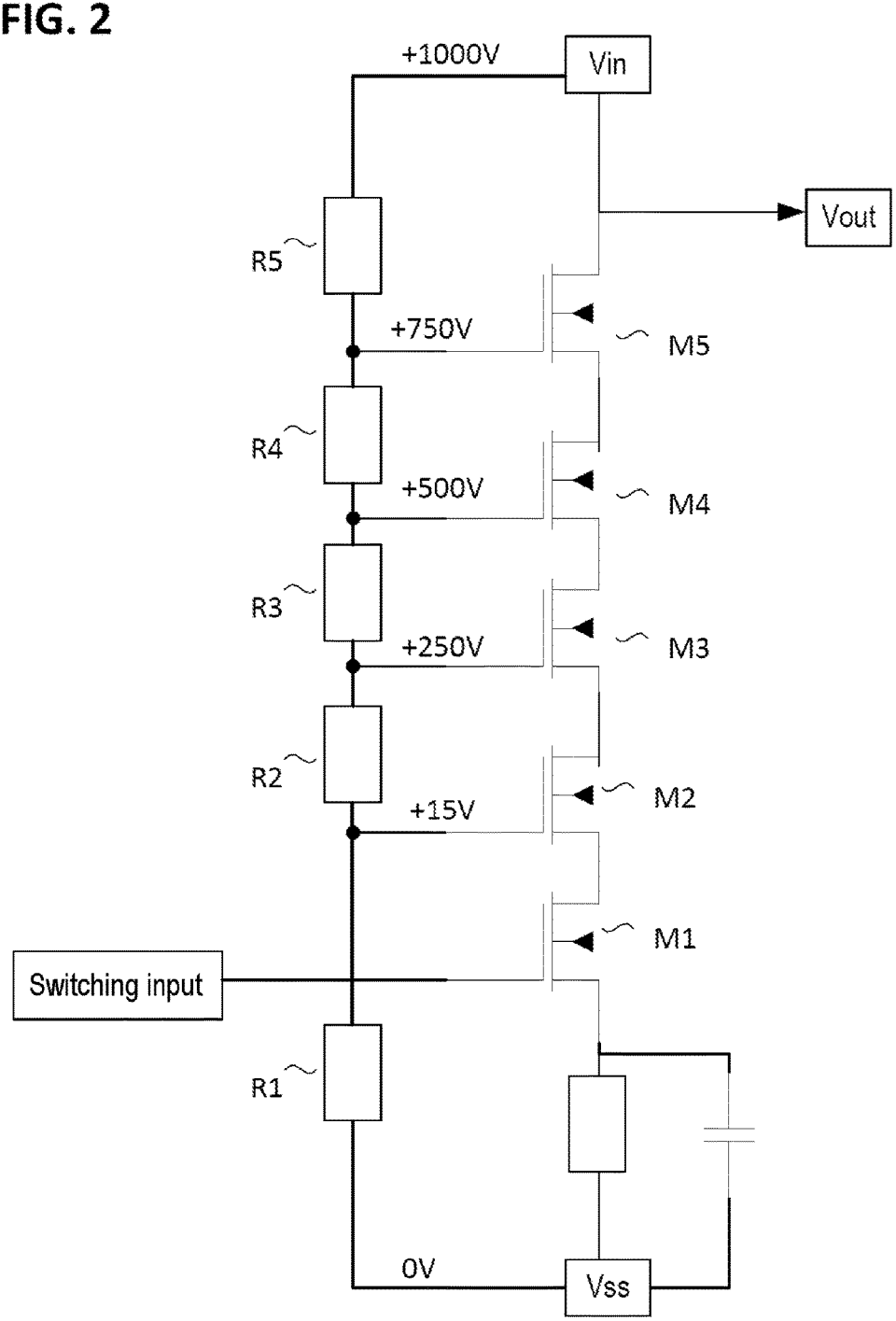
FIG. 2 shows a conventional circuit.

In the following detailed description, reference is made to the appended drawings which form part of said description and in which for the sake of illustration specific embodiments are shown in which the invention can be applied. In this respect, directional terminology such as, for example, "at the top", "at the bottom", "at the front", "at the rear", "front", "rear" etc. are used with respect to the orientation of the described figure or figures. Since components of embodiments can be positioned in a number of different orientations, the directional terminology serves for the purpose of illustration and is not restrictive in any way whatsoever. Of course, other embodiments can be used and structural or logical modifications can be made without departing from the scope of protection of the present invention. Of course, the features of the various exemplary embodiments described herein can be combined with one another unless specifically stated otherwise. The following detailed description is therefore not to be interpreted in a restrictive sense, and the scope of protection of the present invention is defined by the appended claims.

Within the scope of this description, the terms "connected" and "coupled" are used to describe both a direct and an indirect connection as well as a direct or indirect coupling. In the figures, identical or similar elements are provided with identical reference symbols wherever expedient.

According to various embodiments, the term "coupled" or "coupling" can be understood in the sense of a, for example, direct or indirect electrical connection and/or electrical interaction, including a physical connection or interaction. The interaction can be imparted, for example, by means of an electrical current which flows along the current path which is made available by means of the coupling. An electrical connection may include an electrically conductive connection, i.e. with ohmic behaviour, e.g. made available by means of a metal or a degenerated semiconductor material, e.g. in the absence of a pn junction in the electrical current path. An indirect electrical connection may include additional components in the electrical current path, which components do not change the operation of the circuit or leave it essentially unchanged.

A plurality of elements can be coupled to one another, for example, along an interaction chain, e.g. a signal chain. A coupling can be configured to transmit an electrical signal between the two elements which are coupled to one another. The term "uncoupled" can be understood as meaning that the coupling is cancelled. For example, the uncoupling of second elements from one another can cause an electrically conductive connection between them to be cancelled (e.g. to be converted into an electrically insulating connection).

According to various embodiments, a semiconductor area can be processed in order to form one or more chips in the semiconductor area. A chip may include an active chip area. The active chip area can be arranged in a part of the semiconductor area or may include at least one electrical component, (e.g. one electrical component or a plurality of electrical components) such as a transistor, a resistor, a capacity, a diode or the like. The at least one component or a connection between a plurality of components can be configured to execute logic operations, e.g. computing operations or storage operations. Alternatively or additionally, the at least one circuit component or a connection of a plurality of components can be configured to execute switching operations, signal processing and/or amplification operations. Various components, such as e.g. a transistor, a capacitor and/or a diode, can be configured for high-voltage applications (also referred to as high-voltage diode or high-voltage transistor).

According to various embodiments, a chip (also referred to as a semiconductor chip or integrated circuit) can be singulated from the semiconductor area by removing material from a joint (also referred to as a Kerf) of the semiconductor area (also referred to as dicing or cutting the semiconductor area). For example, the removal of material from the joint of the semiconductor area can be carried out by scoring and fracturing, splitting, blade dicing, plasma dicing, laser dicing or mechanical sawing (for example by using a dicing saw). After the singulation of the chip, electrical contact can be formed to it and it can be encapsulated, e.g. by means of a moulding material and/or in a chip carrier (also referred to as a chip housing) which are then suitable for use in electronic devices. For example, the chip can be connected to a chip carrier by means of wires, and the chip carrier can be soldered to a circuit board and/or to a leadframe.

According to various embodiments, a substrate (e.g. a wafer, e.g. a reconfigured wafer) and/or a semiconductor area may include a semiconductor material of one type or of various types or be formed therefrom, including IV semiconductors (e.g. silicon or germanium), connecting semiconductors, e.g. group III-V connecting semiconductors (for example gallium arsenide), group III semiconductors, group V semiconductors or polymers. In some embodiments, the substrate and/or the semiconductor area can be formed from silicon (doped or undoped). In some alternative embodiments, the substrate and/or the semiconductor area can be a silicon-on-insulator (SOI) wafer. As an alternative, any other suitable semiconductor material can be used for the substrate and/or the semiconductor area, for example a semiconductor connection (semiconductive chemical compound) such as gallium phosphide (GaP), indium phosphide (InP), silicon carbide (SiC) or gallium nitride (GaN), but any other suitable ternary semiconductor compound or quaternary semiconductor compound such as, for example, indium gallium arsenide (InGaAs).

The term semiconductor material can be understood as being a chemical compound which has a semiconductive base material, or is formed therefrom and/or is semiconductive in an undoped state (e.g. chemically pure state), i.e. has electrical conductivity in a range of approximately $10^{-6}$ Siemens/Meter up to approximately $10^6$ Siemens/Meter. During the processing of the substrate, the semiconductive base material can be doped in certain areas for example, which increases its electrical conductivity in the doped locations (e.g. over $10^6$ Siemens/Meter). The semiconductor material or the semiconductive base material may include, for example, an element semiconductor (e.g. silicon or germanium) or a compound semiconductor (e.g. silicon carbide or SiGe), or be formed therefrom.

According to various embodiments, various transistor types can be used (e.g. for implementing the switches of the or of each cascode stage and/or of the or of each control stage). For example, a transistor may include at least one of the following transistor types or be formed therefrom: a bipolar transistor (BJT), a BJT with heterojunction, a Schottky BJT, a BJT with insulating gate electrode (IGBT), a field-effect transistor (FET), a barrier layer FET, a metal oxide semiconductor FET (MOSFET), a dual gate MOSFET, a power field effect transistor (e.g. fast-reverse or fast-recovery epitaxial diode FET), a tunnel FET, etc.

According to various embodiments, an electrical voltage can be understood to be an electrical potential difference (difference between two electrical potentials), e.g. between an output and an input. For example, a voltage across a component or component circuitry (i.e. the voltage which drops across the component) can be understood to be the difference between the electrical potentials on opposite sides (e.g. at the terminals) of the component or the component circuitry. A voltage at a node (e.g. a terminal, input, output or the like) can be understood to be the difference between the electrical potential at the node and a reference potential (e.g. electrical ground). Details about a plurality of voltages in a circuit can relate to the same reference potential. If the voltage is positive at a node, the electrical potential thereof is higher than the reference potential. If the voltage is negative at a node, the electrical potential thereof is lower than the reference potential. The higher the electrical voltage at a node, the higher its electrical potential can be. A difference in voltage (e.g. between two nodes) can be understood to be the difference between two voltages which, when the two voltages refer to the same reference potential, corresponds to the difference between the corresponding electrical potentials (e.g. between the two nodes) (i.e. specified independently of the reference potential). A backup potential can represent a backup voltage which corresponds to the difference between the backup potential and the reference potential.

Figure 3A:
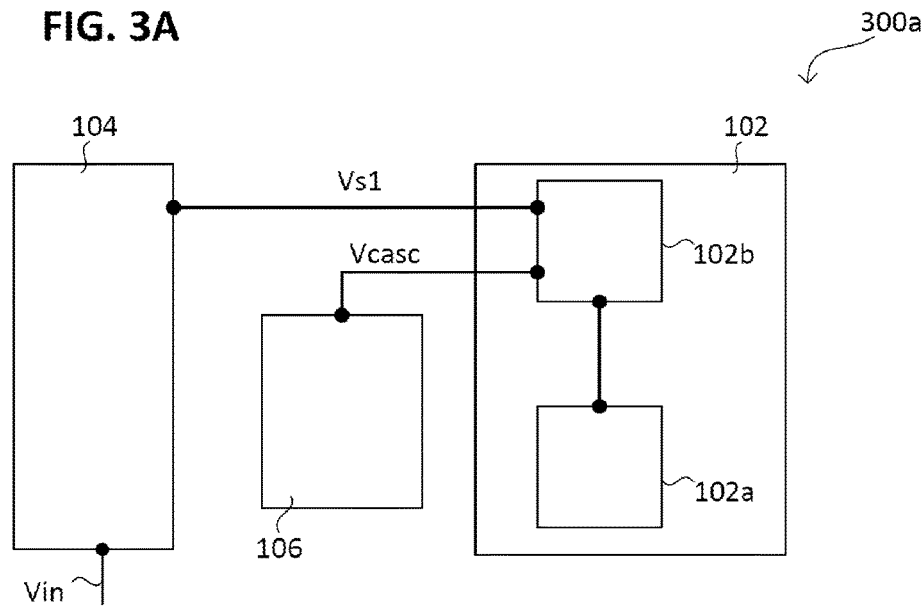
FIGS. 3A and 3B each show a circuit according to various embodiments in a schematic circuit diagram.

FIG. 3A illustrates a circuit 300a according to various embodiments in a schematic circuit diagram.

According to various embodiments, the circuit 300a may have a plurality of cascode stages 102a, 102b connected in series with one another (i.e. connected together to form a cascode circuit 102) e.g. at least two cascode stages 102a, 102b, e.g. two, three, four, five, six, seven, eight, nine, ten or more than ten cascode stages 102a, 102b connected in series, e.g. 6 or 7 cascode stages 102a, 102b connected in series.

The voltage divider 104 can be connected in parallel with the cascode circuit 102 and be coupled to at least one cascode stage 102b in order to make available a first electrical backup potential Vs1 (also referred to as a divided-off first backup potential Vs1 or divided-off backup potential Vs1) at the at least one cascode stage 102b. For example, the first backup potential Vs1 can be divided off, by means of the voltage divider 104, from a voltage Vin (also referred to as input voltage Vin) which is present at the voltage divider 104, e.g. from a high voltage HV.

The controller 106 can be configured to couple the at least one cascode stage 102b to a predefined second electrical backup potential Vcasc (also referred to as auxiliary backup potential Vcasc) if a voltage Vin which is present at the voltage divider 104 satisfies a predefined criterion.

In general, the circuit 300a can be implemented in an inverter, in an output amplifier (e.g. a pad driver circuit) or can be used for bypassing (e.g. short-circuiting), for example if said circuit is coupled to a contactless interface (also referred to as an air interface).

Figure 3B:
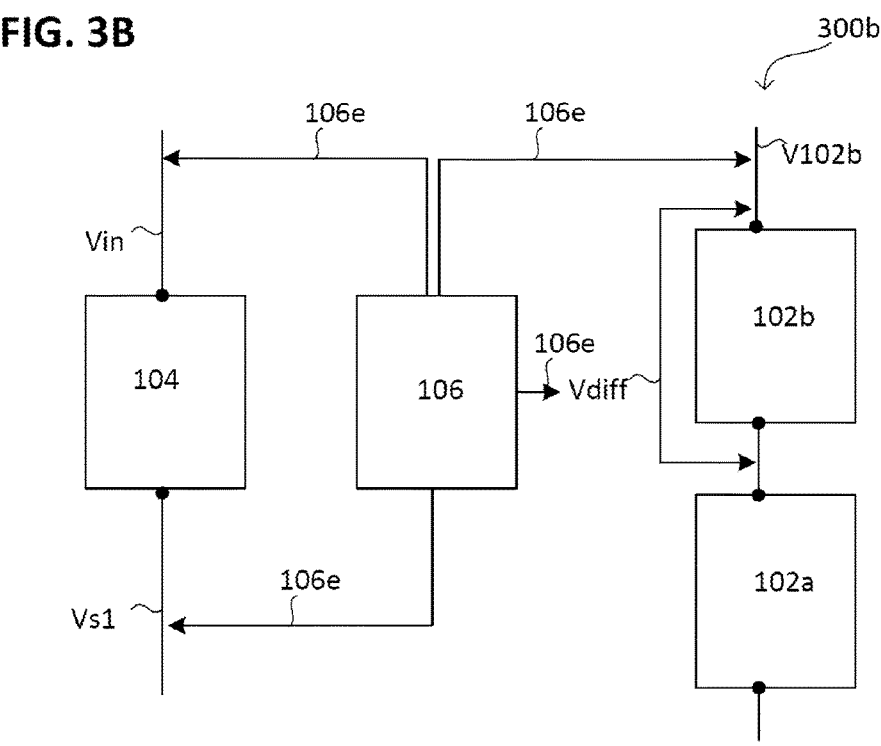

FIG. 3B illustrates a circuit 300b according to various embodiments in a schematic circuit diagram.

In general, the criterion can represent a threshold value for an electrical backup potential for operating the at least one cascode stage 102b (also referred to as a switching criterion). Since the divided-off first backup potential Vs1 depends on the voltage Vin (input voltage Vin) which is present at the voltage divider 104, e.g. is in a fixed ratio to the input voltage Vin (or the corresponding input potential), the criterion can correspond, for example, to a value which the input voltage Vin should at least have for the divided-off electrical backup potential Vs1 to be sufficient to operate the at least one cascode stage 102b.

Figure 12A:
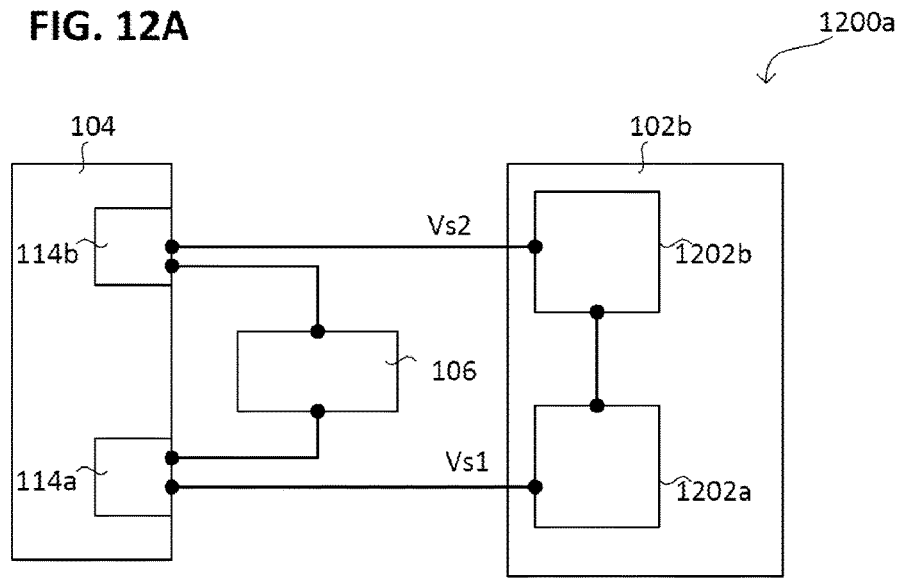
FIGS. 12A and 12B show each show a circuit according to various embodiments in a schematic circuit diagram.
Figure 12B:
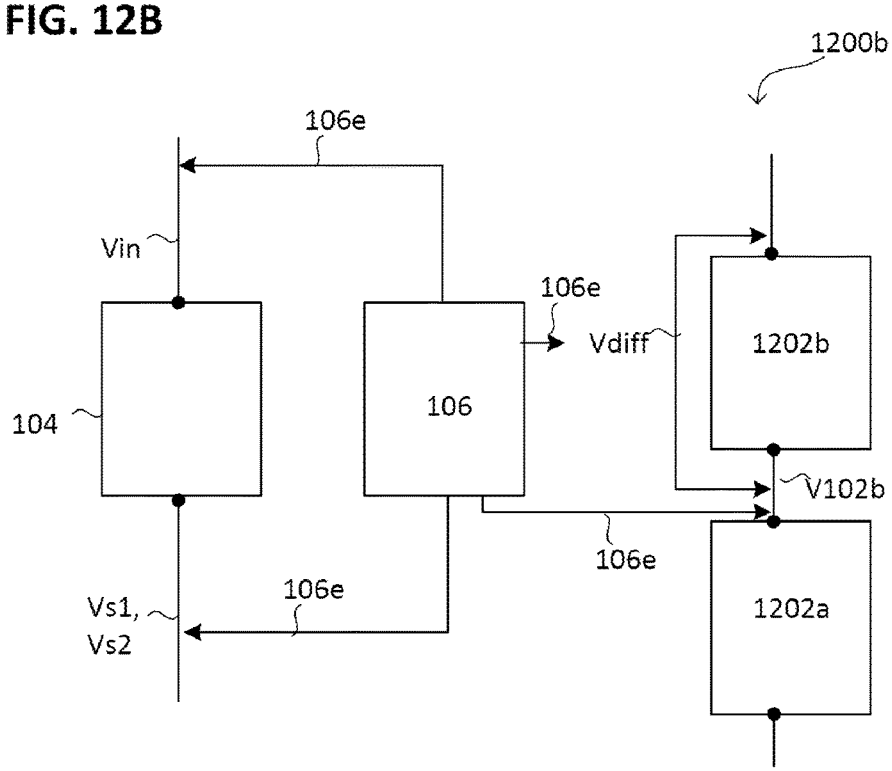
Figure 13:
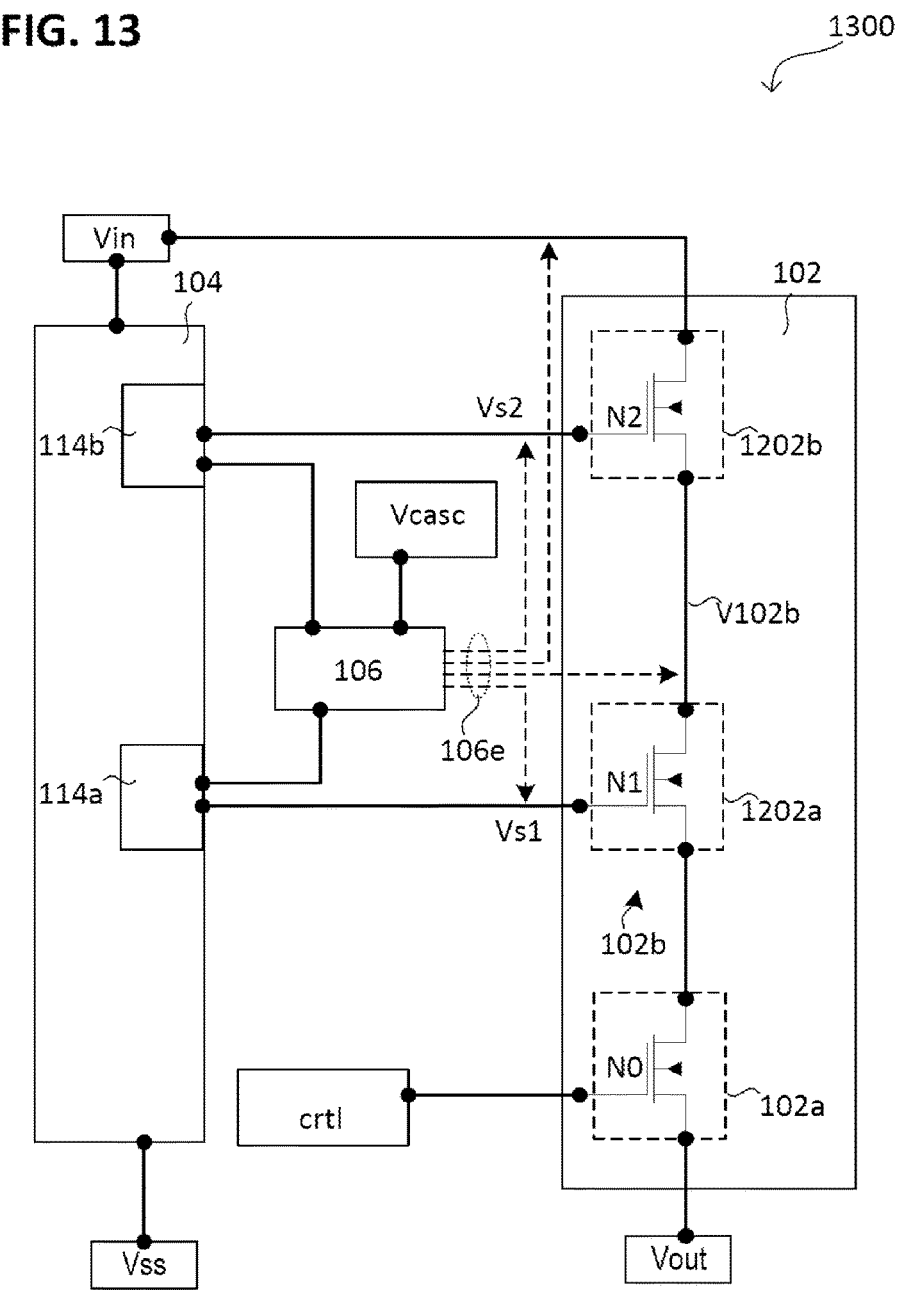
FIG. 13 shows a circuit according to various embodiments in a schematic circuit diagram.

According to various embodiments, in order to determine whether the input voltage Vin satisfies the criterion or not, it is possible to determine 106e an electrical potential or an electrical voltage of the circuit 300b which represents the input voltage Vin (e.g. depends thereon), e.g. the input voltage Vin itself or an electrical potential which is divided off from the input voltage Vin, e.g. a first backup potential Vs1 which is divided off from the input voltage Vin by means of the voltage divider 104, a potential V102b which is divided off from the input voltage Vin by means of the cascode circuit 102 (e.g. by means of the at least one cascode stage 102b) and/or an electrical voltage Vdiff which drops at the at least one cascode stage 102b (cf. also FIG. 12B or FIG. 13).

The criterion can clearly represent a threshold value for the input voltage Vin, at the undershooting of which the controller 106 switches over from the divided-off first backup potential Vs1 to the auxiliary backup potential Vcasc. Alternatively or additionally, the criterion can represent a threshold value for the input voltage Vin, at the exceeding of which the controller 106 switches over from the auxiliary backup potential Vcasc to the divided-off first backup potential Vs1.

According to various embodiments, the controller 106 can determine 106e and/or process 106e the input voltage Vin which is present at the voltage divider 104. For example, the controller 106 can be configured to compare the voltage Vin which is present at the voltage divider 104 with a criterion. The criterion can represent a threshold value for the input voltage Vin up to which the voltage divider 104 makes available a sufficient first electrical backup potential Vs1 in order to operate the at least one cascode stage 102b.

According to various embodiments, alternatively or additionally the controller 106 can detect 116e and process the or each first electrical backup potential Vs1 which is made available by the voltage divider 104. For example, the controller 106 can be configured to compare the first electrical backup potential Vs1, made available by the voltage divider 104, with a criterion. The criterion can represent a threshold value for the first electrical backup potential Vs1 which is required to operate the at least one cascode stage 102b.

According to various embodiments, alternatively or additionally the controller 106 can detect 116e and process a voltage Vdiff dropping across the at least one cascode stage 102b, e.g. a source-gate voltage or a source-drain voltage. For example, the controller 106 can be configured to compare the voltage Vdiff, dropping across the at least one cascode stage 102b, with a criterion. The criterion can represent a threshold value for the voltage Vdiff dropping across the at least one cascode stage 102b, which criterion is required to operate the at least one cascode stage 102b.

According to various embodiments, alternatively or additionally the controller 106 can detect 116e and process one or each electrical potential V102b which is divided off from the cascode circuit 102, e.g. by means of the at least one cascode stage 102b. For example, the controller 106 can be configured to compare an electrical potential V102b which is present at the at least one cascode stage 102b with a criterion. The criterion can represent a threshold value for the first electrical backup potential Vs1 which is required to operate the at least one cascode stage 102b.

The voltage divider 104 can optionally have an internal reference node at which a reference potential, e.g. electrical ground, is present.

Figure 4A:
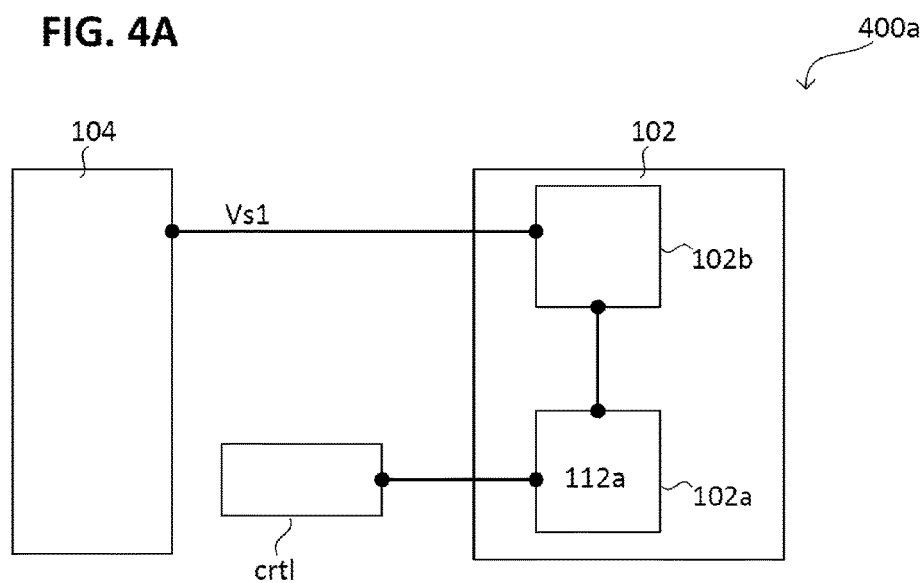
FIGS. 4A and 4B each show a circuit according to various embodiments in a schematic circuit diagram.

FIG. 4A illustrates a circuit 400a according to various embodiments in a schematic circuit diagram.

According to various embodiments, the circuit 400a can have a switching input ctrl for switching the cascode circuit 102. An additional cascode stage 102a of the cascode circuit 102 (also referred to as a switching signal cascode stage 102a) can have, or be formed from, a switch 112a which can be switched by means of the switching input ctrl.

A frequency for operating the circuit 400a, e.g. input by means of the switching input ctrl, can be higher than approximately 1 kHz (kilohertz), e.g. higher than approximately 10 kHz, e.g. higher than approximately 100 kHz, e.g. higher than approximately 1 MHz (megahertz), e.g. approximately 13.56 MHz, e.g. higher than approximately 10 MHz, e.g. higher than approximately 100 MHz, e.g. higher than approximately 500 MHz, e.g. higher than approximately 1 GHz (gigahertz). In general, the frequency of the desired mode of operation can be adapted. For example, a direct voltage can be used.

Figure 4B:
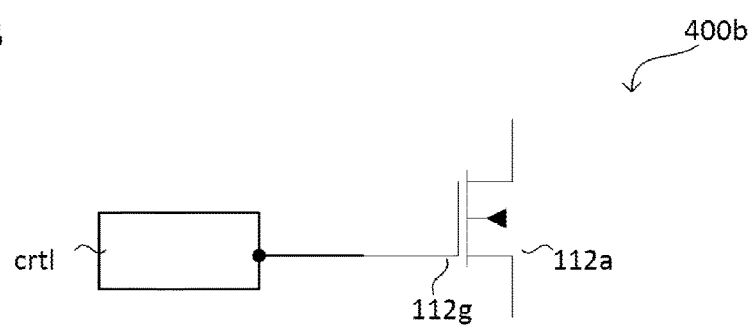

FIG. 4B illustrates a circuit 400b according to various embodiments in a schematic circuit diagram.

According to various embodiments, the switch 112a can be implemented by means of a transistor (e.g. by means of a MOSFET). In this case, the control terminal 112g (e.g. gate or base) of the transistor can be coupled to the switching input ctrl. The transistor can be connected, for example, in source connection mode or emitter connection mode.

Figure 5A:
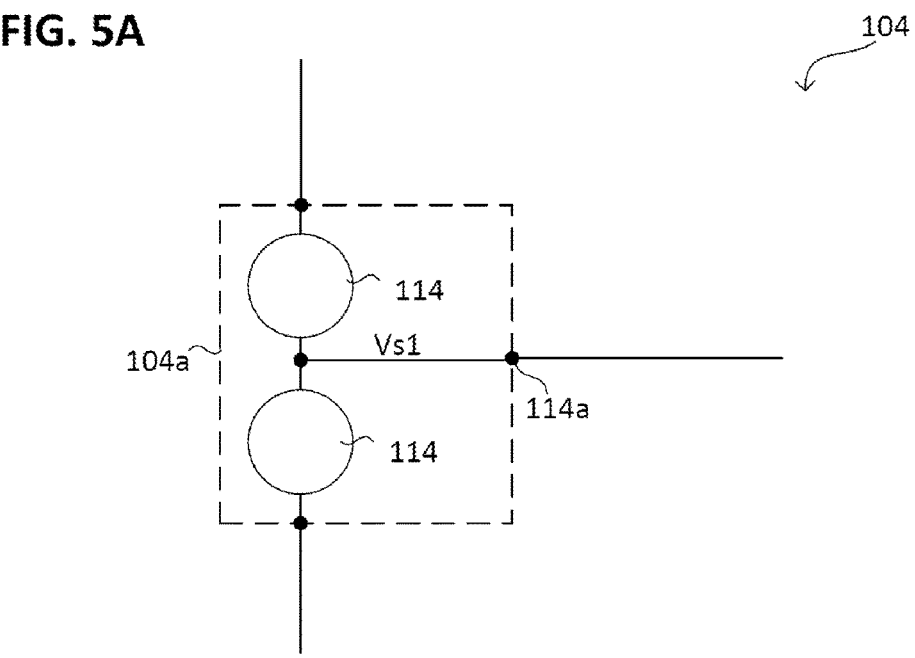
FIGS. 5A and 5B each show a voltage divider according to various embodiments in a schematic circuit diagram.

FIG. 5A illustrates a voltage divider 104 according to various embodiments in a schematic circuit diagram.

According to various embodiments, the circuit divider 104 can have, or be formed from, at least one voltage divider stage 104a.

The voltage divider stage 104a can have at least two voltage divider elements 114 which are connected in series and between which the first electrical backup potential Vs1 is extracted. The first electrical backup potential Vs1 can be extracted by means of a voltage component output 114a. In other words, a voltage component of the voltage which is present at the voltage divider 104 (e.g. the voltage divider stage 104a thereof) can be extracted by means of the voltage component output 114a, said voltage component making available the first electrical backup potential Vs1.

One or each voltage divider element 114 can have at least one of the following: a resistor element 502, a capacitive element 504, an inductive element 506 and/or a rectifier element 508 (e.g. a diode 508), as will be described in more detail below. The voltage divider elements 114 can, for example, be the same as one another, e.g. at least in terms of their electrical impedance, e.g. if each of the voltage divider elements 114 adjoins an additional voltage divider stage 104b. Alternatively, the voltage divider elements 114 can be different from one another, e.g. if at least one of the voltage divider elements 114 adjoins an input of the voltage divider stage 104a.

For example, the voltage divider stage 104a can have a resistance network or be formed therefrom.

Figure 5B:
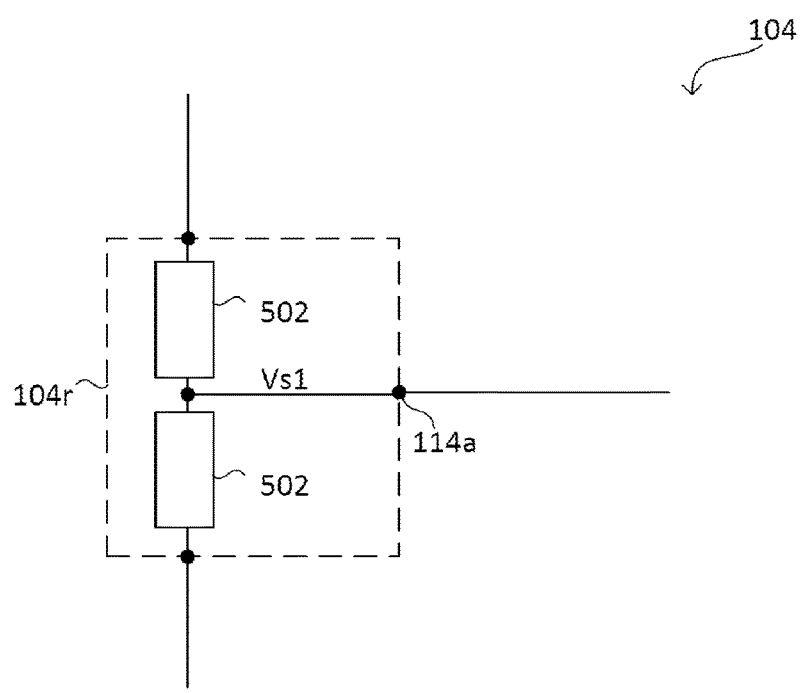

FIG. 5B illustrates a voltage divider 104 according to various embodiments in a schematic circuit diagram.

According to various embodiments, the voltage divider 104 can have at least one resistive voltage divider stage 104r or be formed therefrom.

The resistive voltage divider stage 104r (e.g. having a resistance network or being formed therefrom) can have two resistor elements 502 which are connected in series and between which the first electrical backup potential Vs1 is extracted. One or each resistor element 502 can have a resistive impedance (also referred to as effective resistance or resistance).

One or each resistor element 502 can be made available by means of an ohmic resistor. Alternatively or additionally, one or each resistor element 502 can be made available by means of a transistor which is kept in a transient state, and/or by means of a diode which is connected in the forward direction, e.g. in the case of a direct voltage Vin which is present at the voltage divider 104. The resistor element 502 can optionally be made available by means of two diodes which are connected in antiparallel fashion, e.g. in the case of an alternating voltage which is present at the voltage divider 104. Instead of the diodes which are connected in antiparallel fashion, two transistors which are connected in parallel can be connected in accordance with an antiparallel diode configuration.

Figure 6A:
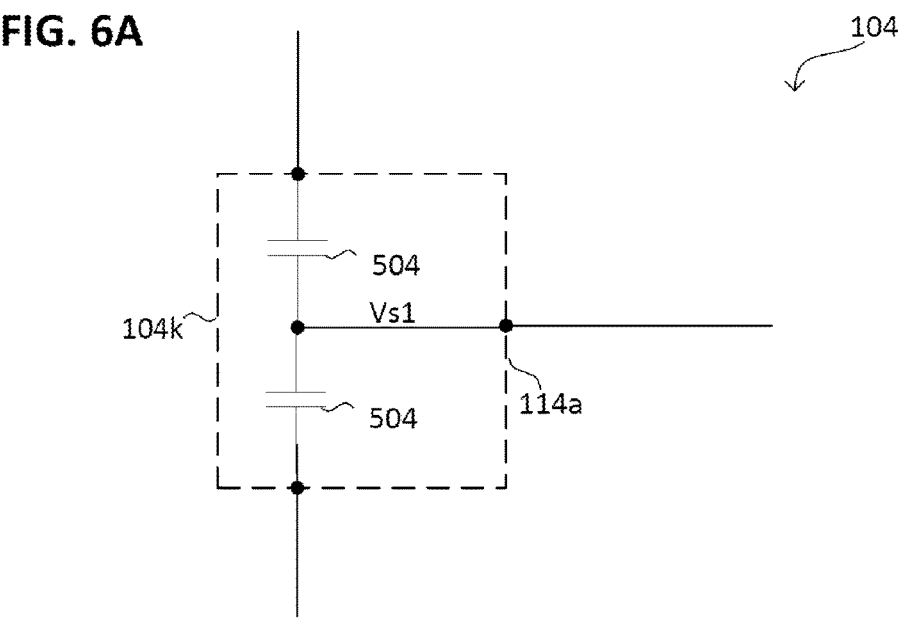
FIGS. 6A and 6B each show a voltage divider according to various embodiments in a schematic circuit diagram.

FIG. 6A illustrates a voltage divider 104 according to various embodiments in a schematic circuit diagram.

According to various embodiments, the voltage divider 104 may include at least one capacitive voltage divider stage 104k or be formed therefrom.

The capacitive voltage divider stage 104k can have two capacitive elements 504 which are connected in series and between which the first electrical backup potential Vs1 is extracted. One or each capacitive element 504 can have a capacitive impedance (also referred to as a capacitor).

One or each capacitive element 504 can be made available by means of a capacitor. Alternatively or additionally one or each capacitive element 504 can be made available by means of a transistor by means of whose source-gate capacitance and/or drain-gate capacitance the capacitance of the capacitive element 504 is made available. For example, the drain and source can be short-circuited to one another.

Figure 6B:
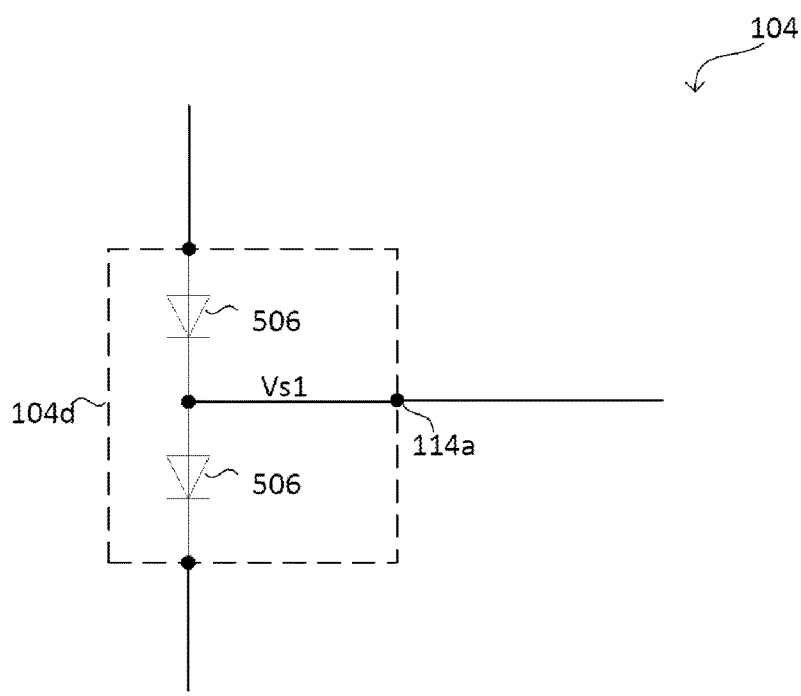

FIG. 6B illustrates a voltage divider 104 according to various embodiments in a schematic circuit diagram.

According to various embodiments, the voltage divider 104 may include at least one rectifying voltage divider stage 104d or be formed therefrom.

The rectifying voltage divider stage 104d can have two rectifier elements 506 which are connected in series and between which the first electrical backup potential Vs1 is extracted. One or each rectifier element 506 can have an electrical impedance which is dependent on the electrical field direction.

One or each rectifier element 506 can be made available by means of a diode. Alternatively or additionally, one or each rectifier element 506 can be made available by means of a transistor which is connected according to a diode configuration.

The or each rectifier element 506 can make available e.g. a protection against electrostatic discharge (ESD protection).

Figure 7A:
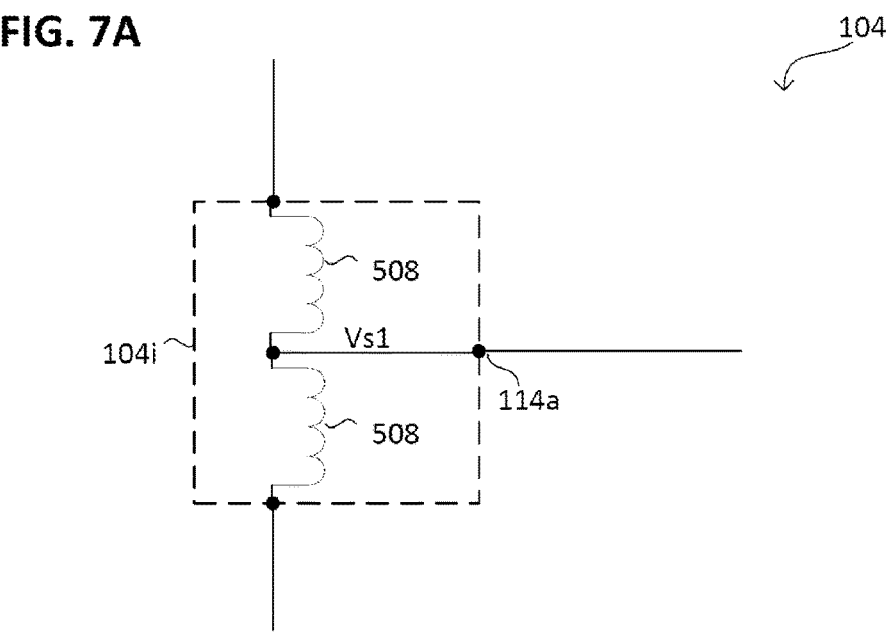
FIGS. 7A and 7B each show a voltage divider according to various embodiments in a schematic circuit diagram.

FIG. 7A illustrates a voltage divider 104 according to various embodiments in a schematic circuit diagram.

According to various embodiments, the voltage divider 104 can have at least one inductive voltage divider stage 104i or be formed therefrom.

The inductive voltage divider stage 104i can have two inductive elements 508 which are connected in series and between which the first electrical backup potential Vs1 is extracted. One or each inductive element 508 can have an inductive impedance (also referred to as an inductance).

One or each inductive element 508 can be made available by means of a conductor loop, e.g. by means of a coil.

Figure 7B:
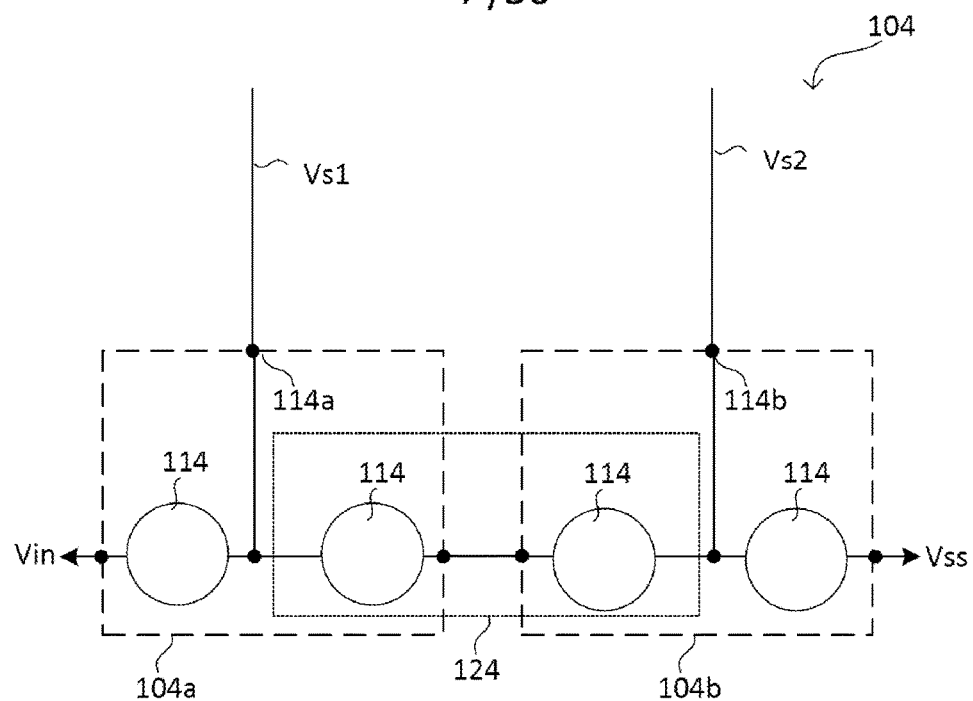

FIG. 7B illustrates a voltage divider 104 according to various embodiments in a schematic circuit diagram.

According to various embodiments, the voltage divider 104 can have, or be formed from, at least two voltage divider stages 104a, 104b which are connected in series. Each of the voltage divider stages 104a, 104b can have at least two voltage divider elements 114. A first backup potential Vs1, Vs2 can be extracted between the voltage divider elements 114 of the or of each voltage divider stage 104a, 104b, e.g. by means of a respective voltage component output 114a, 114b. In other words, the voltage divider 104 can make available a plurality of first backup potentials Vs1, Vs2.

According to various embodiments, the plurality of first backup potentials Vs1, Vs2 can differ from one another.

Respectively adjoining voltage divider elements 114 of the two voltage divider stages 104a, 104b can be made available together by means of an electrical component 124, e.g. by means of a diode, a transistor, a capacitor, an ohmic resistor and/or a coil.

The more cascode stages the at least one cascode stage 102b has, the more voltage divider stages 104a the voltage divider 104 can have. For example, the voltage divider 104 can have precisely as many voltage divider stages 104a as the at least one cascode stage 102b has cascode stages or more. As the number of the voltage divider stages 104a of the voltage divider 104 increases, the criterion can become larger. The threshold value of the backup voltage which is required to operate the cascode stages of the at least one cascode stage 102b can, however, be independent of the number of voltage divider stages 104a of the voltage divider 104.

Figure 8A:
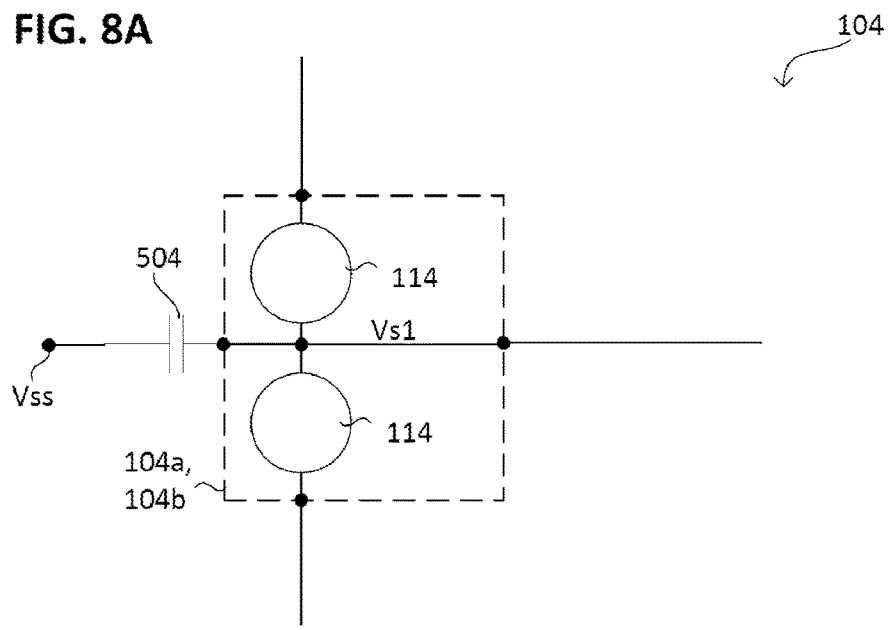
FIG. 8A shows a voltage divider according to various embodiments in a schematic circuit diagram.

FIG. 8A illustrates a voltage divider 104 according to various embodiments in a schematic circuit diagram.

According to various embodiments, the voltage divider 104 can have, or be formed from, at least one voltage divider stage 104a, 140b which is capacitively coupled to a reference potential Vss (e.g. electrical ground GND). The capacitive coupling can be made available by means of a capacitive element 504. The capacitive element 504 can be made available by means of a capacitor and/or by means of a transistor. Alternatively or additionally, the parasitic capacitance of an ohmic resistor can be used to make available the capacitive coupling. In this way it is possible to make available superimposition of the ohmic coupling and capacitive coupling. The larger the resistance of the ohmic resistor, the larger the proportion of the capacitive coupling can be. For example, the capacitive coupling can be made available by means of an ohmic resistor whose resistance is larger than the reciprocal of its (parasitic) capacitance (e.g. referred to the frequency of the voltage Vin which is present).

Figure 8B:
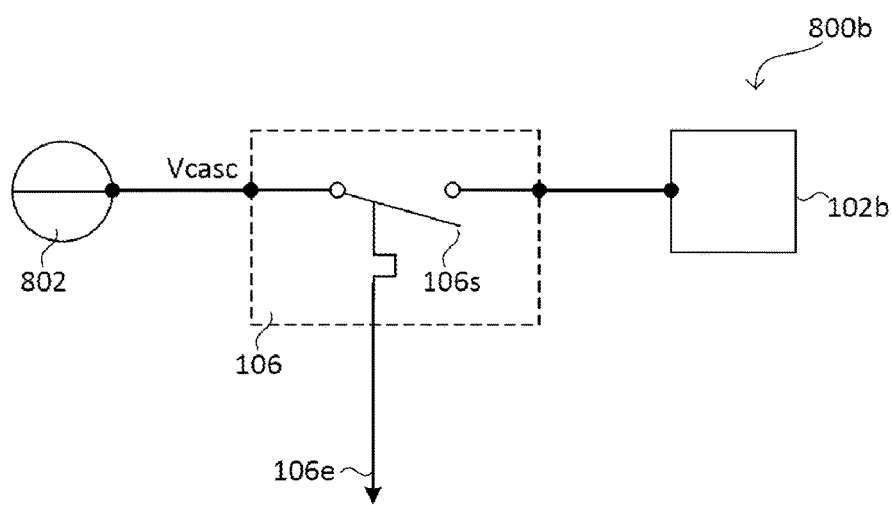
FIG. 8B shows a circuit according to various embodiments in a schematic circuit diagram.

FIG. 8B illustrates a circuit 800b according to various embodiments in a schematic circuit diagram.

According to various embodiments, the circuit 800b may include a voltage source 802 which is configured to make available the auxiliary backup potential Vcasc. The voltage source 802 can be integrated into a chip, e.g. in the same chip as the at least one cascode stage 102b. Alternatively, the voltage source 802 can be arranged outside the chip, e.g. the voltage source 802 can be made available by means of another chip.

The controller 106 may include one or more control stages 106a, 106b, 106c, 106d (cf. FIG. 23), at least one of which is coupled to the auxiliary backup potential Vcasc.

The controller 106 (e.g. the or each control stage) can optionally have a switch 106s which is configured to couple the voltage source 802 to the at least one cascode stage 102b on the basis of a determined voltage 106e and/or processed voltage 106e. The criterion may represent, for example, a threshold voltage Vth of the switch 106s (e.g. at which the switch 106s switches).

According to various embodiments, the controller 106 (e.g. the or each control stage) and the cascode circuit 102 (e.g. the or each cascode stage of the at least one cascode stage 102b, e.g. the cascode stage which is respectively assigned to the control stage) can coincide in their threshold voltage Vth. Alternatively or additionally, the controller 106 (e.g. the or each control stage) and the cascode circuit 102 (e.g. the or each cascode stage of the at least one cascode stage 102b, e.g. the cascode stage which is respectively assigned to the control stage) can be configured to be complementary to one another, at least by means of a CMOS switch pair or by means of an inverter. In this way it is possible to ensure that the switching condition for the controller 106 (e.g. the or each control stage) and the cascode circuit 102 (e.g. the or each cascode stage of the at least one cascode stage 102b, e.g. the cascode stage which is respectively assigned to the control stage) are the same.

According to various embodiments, the voltage source 802 can be configured in such a way that the auxiliary backup potential Vcasc has less fluctuation (e.g. potential variation) than the input voltage Vin (e.g. a potential difference across the voltage divider). A stable electrical voltage (e.g. one which is constant over time) can clearly be made available by means of the voltage source 802. For example, the voltage source 802 can be supplied by means of a supply voltage VDD.

Alternatively, the auxiliary backup potential Vcasc can be made available by means of the supply voltage VDD. The voltage source 802 can then be omitted, for example.

Figure 9A:
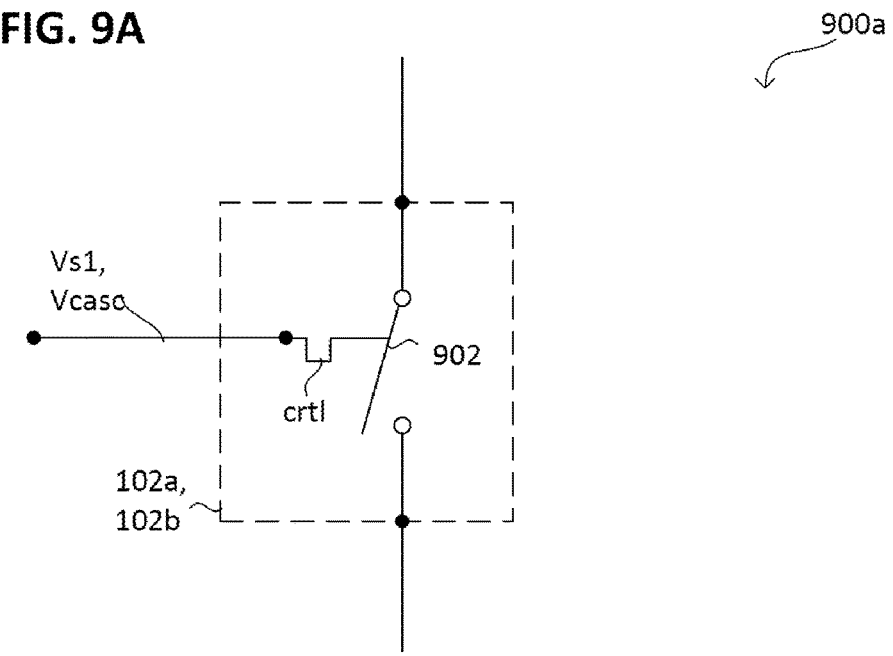
FIG. 9A shows a cascode stage according to various embodiments in a schematic circuit diagram.

FIG. 9A illustrates a cascode stage 900a according to various embodiments in a schematic circuit diagram, e.g. the switching signal cascode stage 102a and/or the or each cascode stage of the at least one cascode stage 102b.

According to various embodiments, the cascode stage 900a may include a switch 902 or be formed therefrom. The switch 902 can be configured to be switched by means of the backup potential Vs1, Vcasc which is respectively input into the cascode stage 900a (e.g. which is input by means of the switching input ctrl).

The switch 902 may be, for example, a transistor or be formed therefrom (cf. FIG. 4B). The gate or the base of the transistor can make available the switching input ctrl.

In the case of the switching signal cascode stage 102a, the switch 902 may include a switching input ctrl which is coupled e.g. to a signal generator. For example, the transistor of the switching signal cascode stage 102a can be connected in a source connection mode or emitter connection mode.

In the case of the or of each cascode stage of the at least one cascode stage 102b the switch 902 may include a switching input ctrl which is coupled to the controller 106 (e.g. to the control stage assigned thereto) and/or to the voltage divider 104 (e.g. to the voltage divider stage assigned thereto), for example to the voltage divider 104 and/or to the voltage source 802 by means of the controller 106. For example, the transistor of the or of each cascode stage of the at least one cascode stage 102b can be connected in gate connection mode or base connection mode.

Figure 9B:
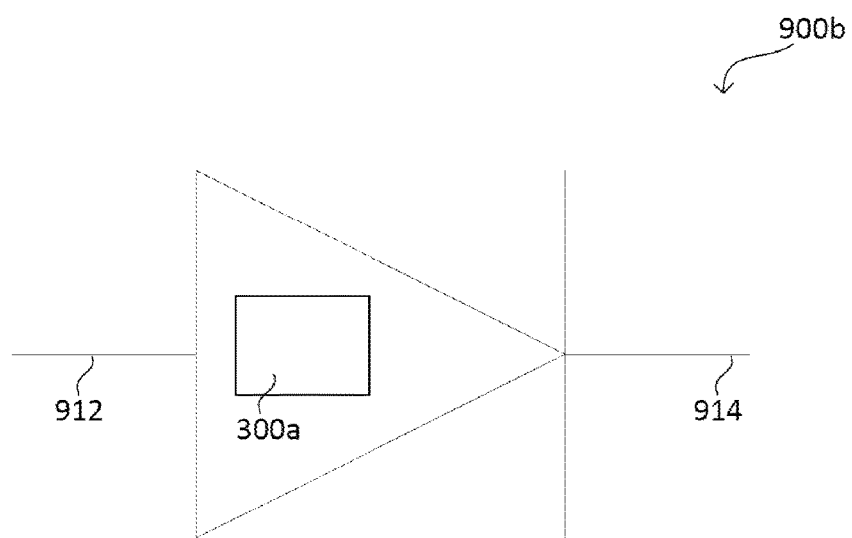
FIG. 9B shows a rectifier circuit according to various embodiments in a schematic circuit diagram.

FIG. 9B illustrates a rectifier circuit 900b according to various embodiments in a schematic circuit diagram.

The rectifier circuit 900b may include a circuit 300a (or some other circuit described herein) according to one or more embodiments or be formed therefrom. The rectifier circuit 900b can be configured to rectify a mixed voltage which is input therein, wherein the rectified mixed voltage can make available a direct voltage, e.g. a pulsating direct voltage.

The rectifier circuit 900b may include an input 912 for inputting the mixed voltage (e.g. an alternating voltage) into the rectifier circuit 900b. The rectifier circuit 900b may include an output 914 for extracting the direct voltage.

Figure 10A:
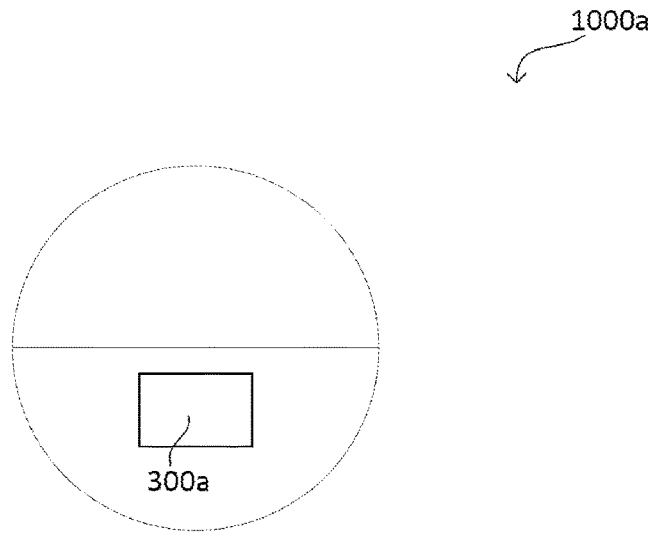
FIG. 10A shows a voltage source according to various embodiments in a schematic circuit diagram.

FIG. 10A illustrates a voltage source 1000a according to various embodiments in a schematic circuit diagram.

According to various embodiments, the voltage source 1000a may include a circuit 300a (or some other circuit described herein) according to one or more embodiments or be formed therefrom.

For example, the voltage source 1000a may include a direct voltage source or be formed therefrom. The direct voltage source may include, for example, a rectifier circuit 900b, 2800b (cf. FIG. 9B and FIG. 28).

Figure 10B:
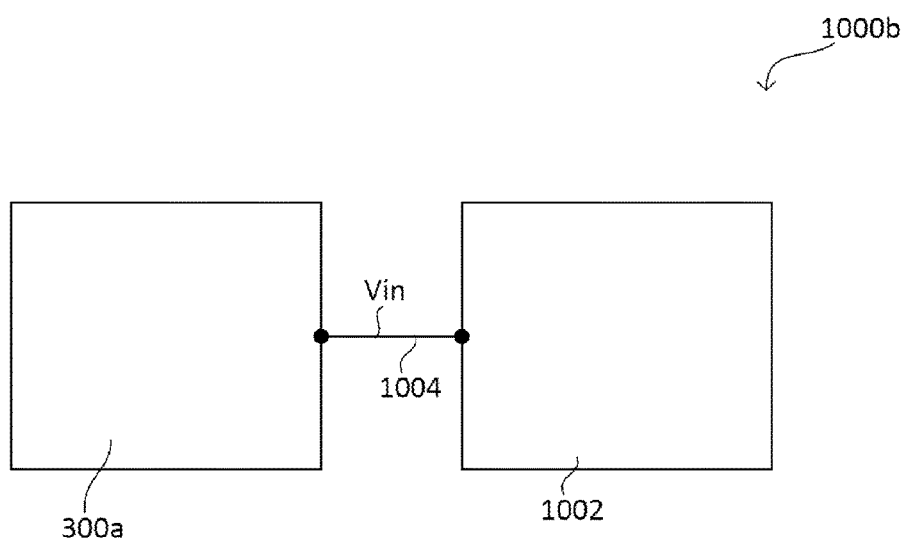
FIG. 10B shows a circuit arrangement according to various embodiments in a schematic circuit diagram.

FIG. 10B illustrates a circuit arrangement 1000b according to various embodiments in a schematic circuit diagram.

The circuit arrangement 1000b may include a first circuit 300a (or some other circuit described herein) according to one or more embodiments. In addition, the circuit arrangement 1000b may include a second circuit 1002. The second circuit 1002 may be configured for contactless communication.

The second circuit 1002 can generate, for example, a signal 1004 (e.g. a switching signal, an energy supply signal or a communication signal) and input it into the first circuit 300a. Alternatively or additionally, the second circuit 1002 can generate a voltage Vin (e.g. a high voltage HV) and input it into the first circuit 300a. For example, the second circuit 1002 may include a contactless voltage source 802, 1000a or be formed therefrom.

Figure 11A:
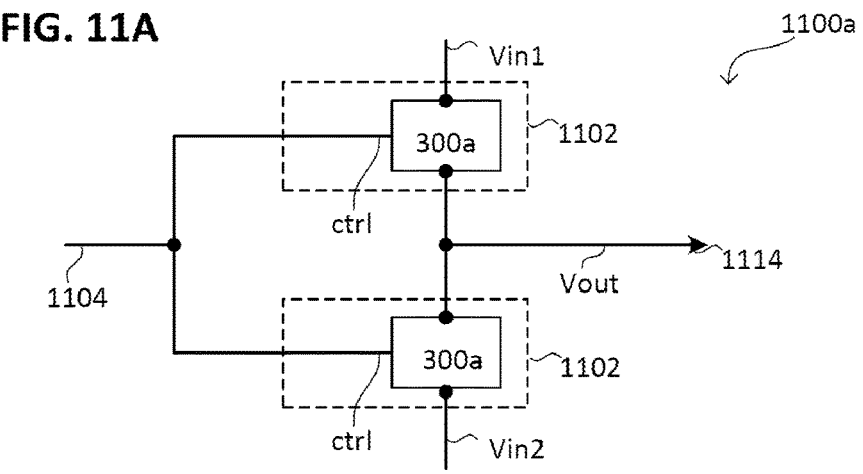
FIG. 11A shows an inverter according to various embodiments in a schematic circuit diagram.

FIG. 11A illustrates an inverter 1100a according to various embodiments in a schematic circuit diagram.

According to various embodiments, the inverter 1100a may include a circuit 300a (or some other circuit described herein) according to one or more embodiments or be formed therefrom. For example, the inverter 1100a may include a gate (e.g. a CMOS gate) or be formed therefrom.

For example, the inverter 1100a (e.g. the gate thereof) can be based on NMOS technology or on PMOS technology. Alternatively, the inverter 1100a can be based on CMOS technology.

The inverter 1100a may include two switch structures 1102 (also referred to as low side and high side) which are complementary (i.e. configured in differential mode) and connected in series and can be implemented, for example, by means of CMOS technology. For example, the low side and the high side can differ in the doping type of their or of each channel. In other words, the low side can be made available by means of NMOS technology and the high side by means of PMOS technology, or the other way round.

According to various embodiments, the low side and/or the high side may include a circuit 300a (or some other circuit described herein) according to one or more embodiments or be formed therefrom. For example, the low side or the high side can be made available by means of a resistor element. Alternatively, the low side and the high side may include a circuit 300a (or some other circuit described herein) according to one or more embodiments, or be formed therefrom.

At least one circuit 300a of the inverter 1100a (e.g. of the high side), can be switched between a first input voltage Vin1 (e.g. a high voltage HV) and an output 1114 of the inverter 1100a. Alternatively or additionally, a circuit 300a of the inverter 1100a (e.g. of the low side) can be switched between a second input voltage Vin2 (e.g. made available by means of a reference potential Vss) and the output 1114 of the inverter 1100a. The output 1114 of the inverter 1100a can be switched between the two complementary switch structures 1102.

An input 1104 of the inverter 1100a can be coupled to the switching input ctrl of the or of each circuit 300a of the inverter 1100a. The inverter 1100a can be configured to make available, with respect to a first signal which is input into the latter (input at least by means of the input 1104), a second signal (e.g. by means of the output 1114) which is complementary to the first signal.

Figure 11B:
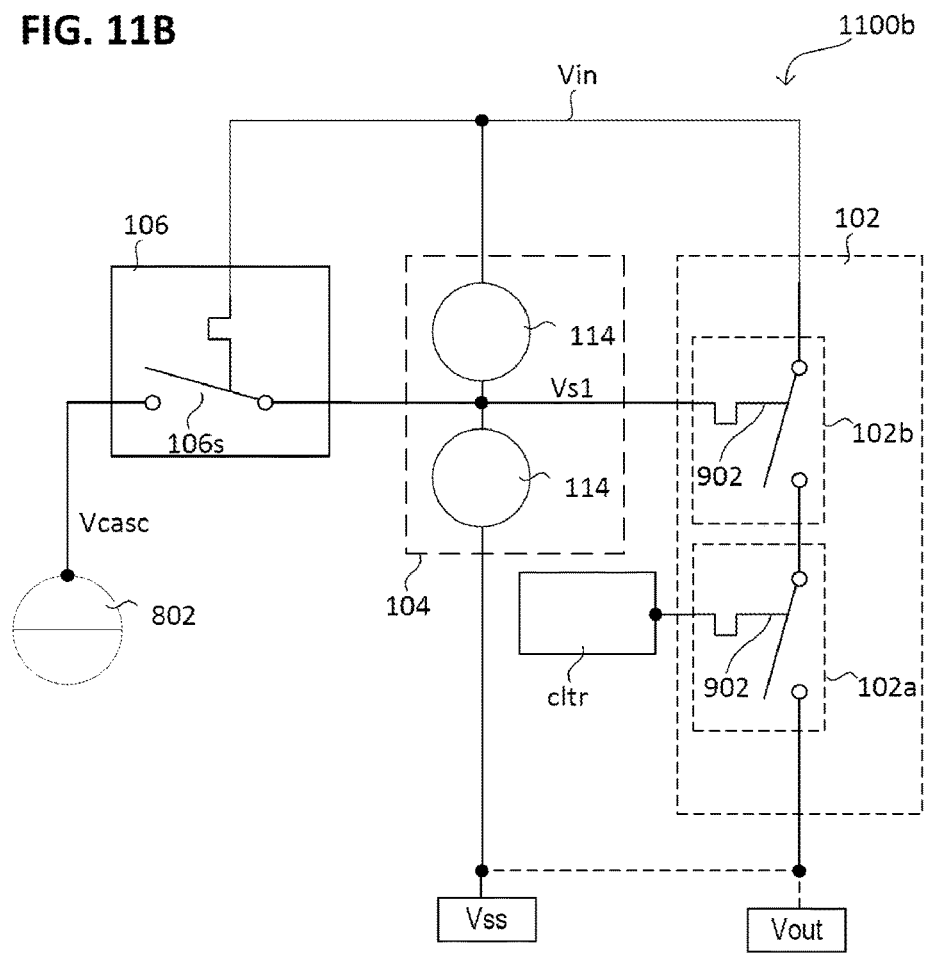
FIG. 11B shows a circuit according to various embodiments in a schematic circuit diagram.

FIG. 11B illustrates a circuit 1100b according to various embodiments in a schematic circuit diagram.

The input voltage Vin (e.g. the high voltage HV) can be present at the voltage divider 104, at the controller 106 (the switching input thereof) and at the cascode circuit 102, made available e.g. as a difference between an electrical input potential Vin and the reference potential Vss (e.g. electrical ground GND). The first backup potential Vs1 can be divided off from the input voltage Vin by means of the voltage divider 104.

The switching signal cascode stage 102a can be controlled by means of the switching input ctrl. The at least one cascode stage 102b (e.g. the gate thereof) can be assisted by means of a switched backup potential Vs1, Vcasc. The switched backup potential Vs1, Vcasc can be the divided-off first backup potential Vs1 if the input voltage Vin does not satisfy the predefined criterion (e.g. is the same as or more than a predefined value). The switched backup potential Vs1, Vcasc can be the auxiliary backup potential Vcasc if the input voltage Vin satisfies the predefined criterion (e.g. is below the predefined value).

The cascode circuit 102 can be configured to bypass the input voltage Vin and an output voltage Vout.

For example, the cascode circuit 102 can be configured to extract an output voltage Vout.

Alternatively, the output voltage Vout can be the reference voltage Vss. Then, the input voltage Vin can be switched by means of the cascode circuit 102.

FIG. 12A illustrates a circuit 1200a according to various embodiments in a schematic circuit diagram.

The at least one cascode stage 102b may include a plurality of cascode stages, e.g. at least a first cascode stage 1202a and a second cascode stage 1202b.

The voltage divider 104 can be connected in parallel with the first cascode stage 1202a and the second cascode stage 1202b. The voltage divider 104 may include a first voltage component output 114a which is coupled to the first cascode stage 1202a. In addition, the voltage divider 104 may include a second voltage component output 114b which is coupled to the second cascode stage 1202b. Each voltage component output 114a, 114b can be made available by means of a voltage divider stage 104a.

The voltage divider 104 can make available a plurality of first backup potentials Vs1, Vs2, e.g. each by means of a voltage component output 114a, 114b. A first backup potential Vs1 can be made available (e.g. extracted) by means of the first voltage component output 114a. An additional first backup potential Vs2 can be made available (e.g. extracted) by means of the second voltage component output 114b.

The controller 106 can be configured to couple the first voltage component output 114a to the second voltage component output 114b if a voltage at the second voltage component output 114b and/or the input voltage Vin satisfies a predefined criterion, e.g. is below a threshold value. The second voltage component output 114a can clearly be short-circuited to the second voltage component output 114b by means of the controller 106. In other words, at least one voltage divider stage of the voltage divider 104 can be bypassed by means of the controller 106.

FIG. 12B illustrates a circuit 1200b according to various embodiments in a schematic circuit diagram.

According to various embodiments, the controller 106 can determine 106e and/or process 106e the input voltage Vin which is present at the voltage divider 104. For example, the controller 106 can be configured to compare the input voltage Vin which is present at the voltage divider 104 with a criterion. The criterion can represent a threshold value for the voltage which is required at the second cascode stage 1202b, up to which criterion the voltage divider 104 makes available a sufficient first electrical backup potential Vs2 in order to operate the second cascode stage 1202b.

Alternatively or additionally, the controller 106 can determine 116e and process the or each electrical potential which is divided off from the input voltage Vin, e.g. the or each first electrical backup potential Vs1, Vs2 made available by the voltage divider 104 (e.g. the additional first electrical backup potential Vs2) and/or the or each electrical potential Vdiff, V102b divided off from the at least one cascode stage 102b. For example, the controller 106 can be configured to compare the or each divided-off electrical potential with a criterion. The criterion can represent a threshold value for the divided-off electrical potential which is required to operate the first cascode stage 1202a and/or the second cascode stage 1202b.

FIG. 13 illustrates a circuit 1300 according to various embodiments in a schematic circuit diagram.

The first cascode stage 1202a and/or the second cascode stage 1202b can each have a transistor N1, N2 in gate connection mode or base connection mode or be formed therefrom. The switching signal cascode stage 102a may include a transistor N0 in source connection mode or emitter connection mode or be formed therefrom.

According to various embodiments, the voltage divider 104 can be coupled on the output side to each cascode stage 1202b, 1202a of the at least one cascode stage 102b, e.g. by means of a respective voltage component output 114a, 114b.

The voltage divider 104 can be configured to make available a first voltage component of the input voltage Vin (e.g. the operating voltage of the circuit 1300, of a high operating voltage HV) for extracting the first backup potential Vs1 and/or for inputting it into a gate of the first cascode stage 1202a. Alternatively or additionally, the voltage divider 104 can be configured to make available a second voltage component of the input voltage Vin for extracting an additional first backup potential Vs2 and/or for inputting it into a gate of the second cascode stage 1202b.

The controller 106 can be configured to couple the gate of the first cascode stage 1202a to the auxiliary backup potential Vcasc if the input voltage Vin satisfies the predefined criterion, e.g. in that said controller 106 couples the first voltage component output 114a to the auxiliary backup potential Vcasc. Alternatively or additionally, the controller 106 can be configured to couple the gate of the first cascode stage 1202a to the additional first backup potential Vs2 if the input voltage Vin satisfies the predefined criterion, e.g. in that said controller 106 couples the first voltage component output 114a to the second voltage component output 114b and/or in that said controller 106 couples the gate of the first cascode stage 1202a and the gate of the second cascode stage 1202b to one another.

FIG. 14 illustrates a method 1400 for operating a circuit according to various embodiments in a schematic flowchart.

According to various embodiments, the method 1400 can optionally include in 1401: inputting of a switching signal into a cascode stage of the plurality of cascode stages, e.g. into the switching input ctrl of the switching signal cascode stage. The plurality of cascode stages can be connected through by means of the switching signal.

The method 1400 may include in 1403: coupling at least one cascode stage of the plurality of cascode stages (e.g. the first cascode stage and/or the second cascode stage), to a predefined backup potential (e.g. the auxiliary backup potential) if a voltage which is present at the circuit (e.g. the high voltage HV) satisfies a predefined criterion.

The method 1400 can also include in 1405: otherwise coupling the at least one cascode stage to a backup potential which is divided off from the voltage (e.g. the first backup potential).

Each cascode stage of the at least one cascode stage can be coupled to a divided-off backup potential (e.g. made available by means of a voltage divider stage) which is assigned to said cascode stage.

Figure 15A:
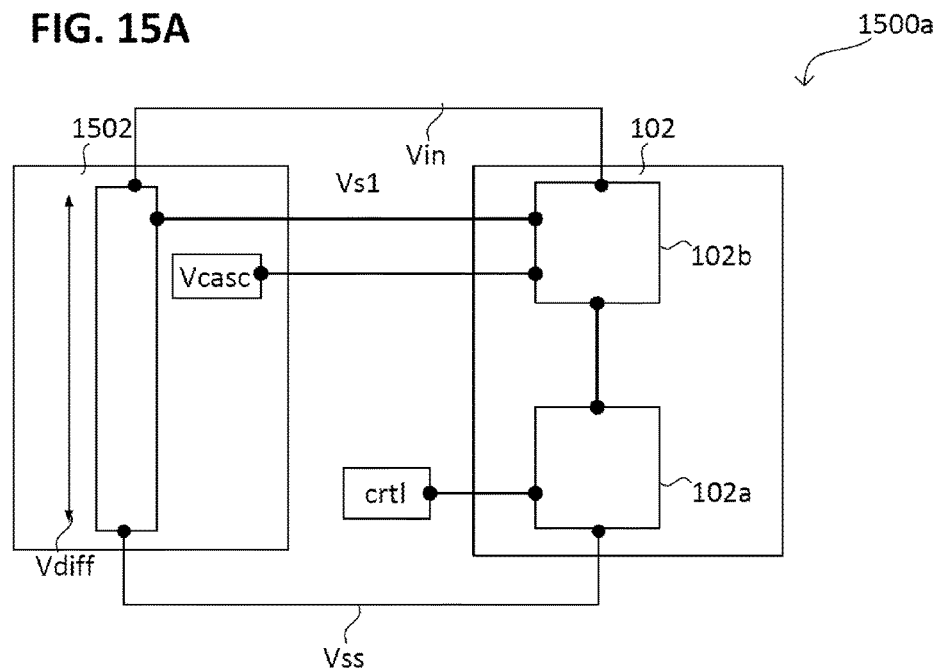
FIGS. 15A and 15B each show a circuit according to various embodiments in a schematic circuit diagram.

FIG. 15A illustrates a circuit 1500a according to various embodiments in a schematic circuit diagram, having a cascode circuit 102.

A switching signal cascode stage 102a may include a switching input ctrl for switching the cascode circuit 102.

The potential regulator 1502 can be configured to couple the at least one cascode stage 102b of the cascode circuit 102 to an auxiliary backup potential Vcasc if a potential difference Vdiff (Vdiff=Vin−Vss) across the cascode circuit 102 satisfies a predefined criterion, and otherwise to couple it to a backup potential Vs1 which is divided off from the potential difference Vdiff.

According to various embodiments, the potential regulator 1502 may include a voltage divider 104 for dividing off the backup potential Vs1 as described above. Alternatively or additionally, the potential regulator 1502 may include a voltage source for making available the auxiliary backup potential Vcasc.

Figure 15B:
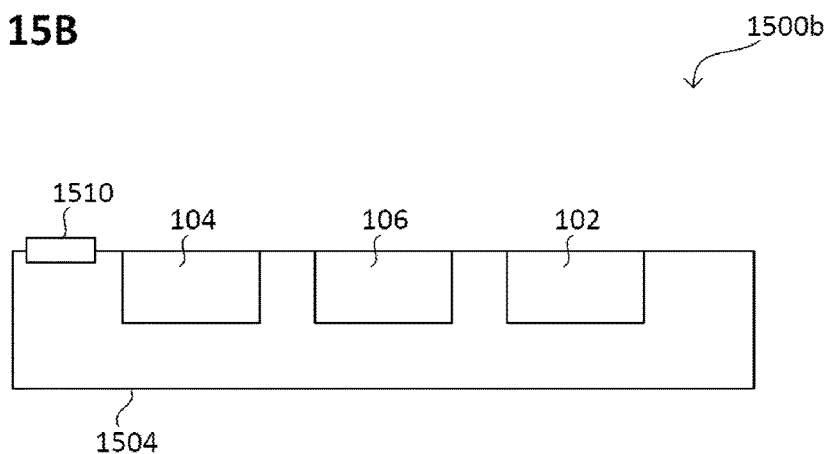

FIG. 15B illustrates a circuit 1500b according to various embodiments in a schematic cross-sectional view.

According to various embodiments, the circuit 1500b can be integrated into a substrate 1504, e.g. into a semiconductor substrate 1504. For example, at least the cascode circuit 102, the controller 106 and/or the voltage divider 104 can be part of an integrated circuit or form said integrated circuit, e.g. a semiconductor circuit. The substrate 1504 can be part of a chip.

The circuit 1500b can also have a supply terminal 1510 for supplying the circuit 1500b with an electrical supply voltage. The electrical supply voltage (also referred to as VDD) can generally refer to an electrical voltage which is input from the outside into a circuit or a chip, e.g. by means of corresponding contacts of the chip or by means of contactless transmission. Alternatively or additionally, the input voltage Vin (e.g. a high voltage HV) and/or an auxiliary backup voltage for making available the auxiliary backup potential Vcasc can be input by means of the supply terminal 1510.

An electrical voltage (and/or the electrical potential assigned thereto) can be understood to be a discrete value and/or a voltage range around the discrete value, e.g. a voltage range of ±10% of the discrete value.

Figure 16:
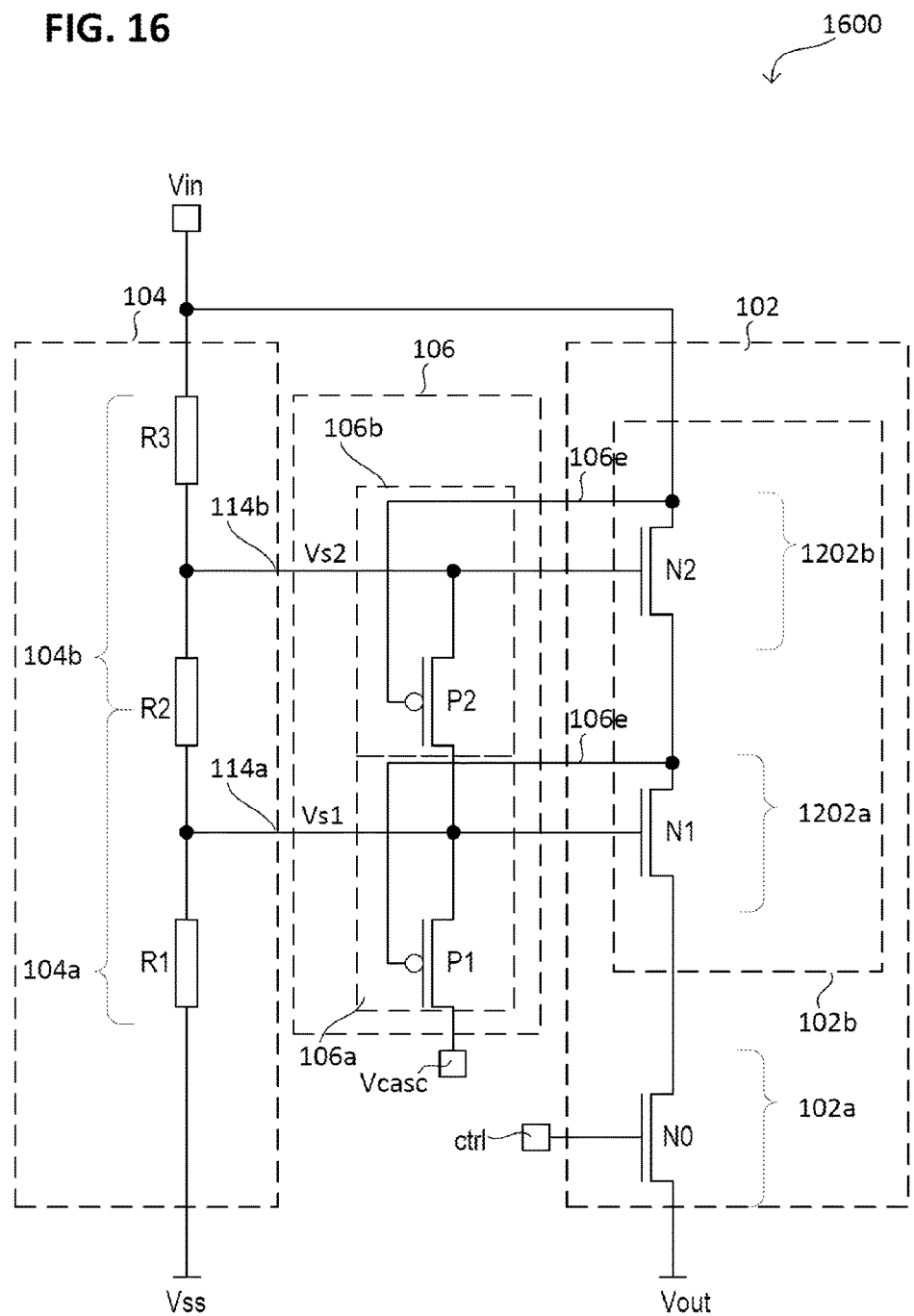
FIGS. 16 to 19 each show a circuit according to various embodiments in a schematic circuit diagram.

FIG. 16 illustrates a circuit 1600 according to various embodiments in a schematic circuit diagram.

The controller 106 may include or be formed from a plurality of control stages 106a, 106b, of which each control stage is assigned to a cascode stage 1202a, 1202b of the at least one cascode stage 102b and/or a voltage divider stage 104a, 104b of the voltage divider 104. Each control stage can be made available by means of a transistor P1, P2 (e.g. PMOS transistor).

The voltage divider 104 may include or be formed from a plurality of voltage divider stages 104a, 104b, each voltage divider stage of which is assigned to a cascode stage 1202a, 1202b of the at least one cascode stage 102b. The voltage divider stages 104a, 104b of the voltage divider 104 can be made available, for example, by means of ohmic resistors R1, R2, R3, as illustrated in FIG. 16. For example, the voltage divider 104 may include a resistance network R1, R2, R3 or be formed therefrom. Alternatively, other voltage divider elements can be used, as is described above and is also explained in more detail below.

Each cascode stage 102a, 1202a, 1202b of the cascode circuit 102 can be made available by means of a transistor N0, N1, N2 (e.g. NMOS transistors).

In general, the transistors P1, P2 of the control stages 106a, 106b and the transistors N0, N1, N2 of the cascode stages 102a, 102b can differ in the doping type of their channel (e.g. p channel or n channel).

Each control stage 106a, 106b (first control stage 106a and second control stage 106b) can be connected between the cascode stage 1202a, 1202b assigned to them and the voltage divider stage 104a, 104b assigned to them. Each control stage 106a, 106b can be controlled 106e by means of a voltage which is present at the cascode stage 1202a, 1202b assigned to them and/or is divided off from the input voltage Vin between said cascode stage 1202a, 1202b and one other cascode stage.

The first control stage 106a can be configured to input the auxiliary backup potential Vcasc into the first cascode stage 1202a if the first backup potential Vs1, Vs2 which is divided off from the voltage divider stage 104a which is assigned to them satisfies a predefined criterion. The second control stage 106b can be configured to input the auxiliary backup potential Vcasc into the second cascode stage 1202b if the backup potential which is divided off by means of the voltage divider stage 104b which is assigned to said cascode stage 1202b satisfies a predefined criterion.

The auxiliary backup potential Vcasc can be a low voltage LV, e.g. lower than the input voltage Vin (e.g. the high voltage HV).

Figure 17:
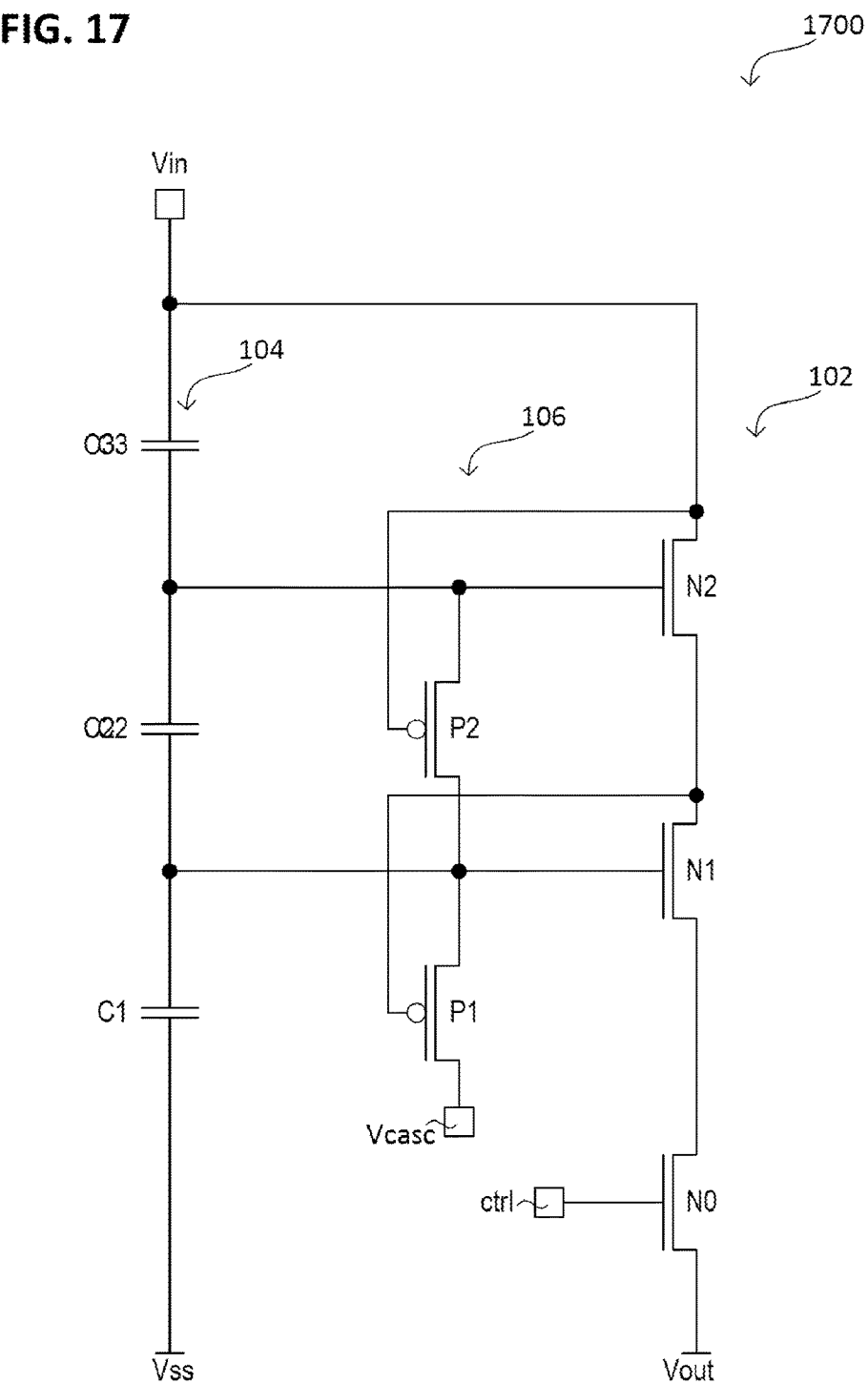

FIG. 17 illustrates a circuit 1700 according to various embodiments in a schematic circuit diagram.

The circuit 1700 can be similar to the circuits described above, wherein at least one or each voltage divider stage 104a, 104b of the voltage divider 104 can be made available by means of a capacitor C1, C2, C3.

Figure 18:
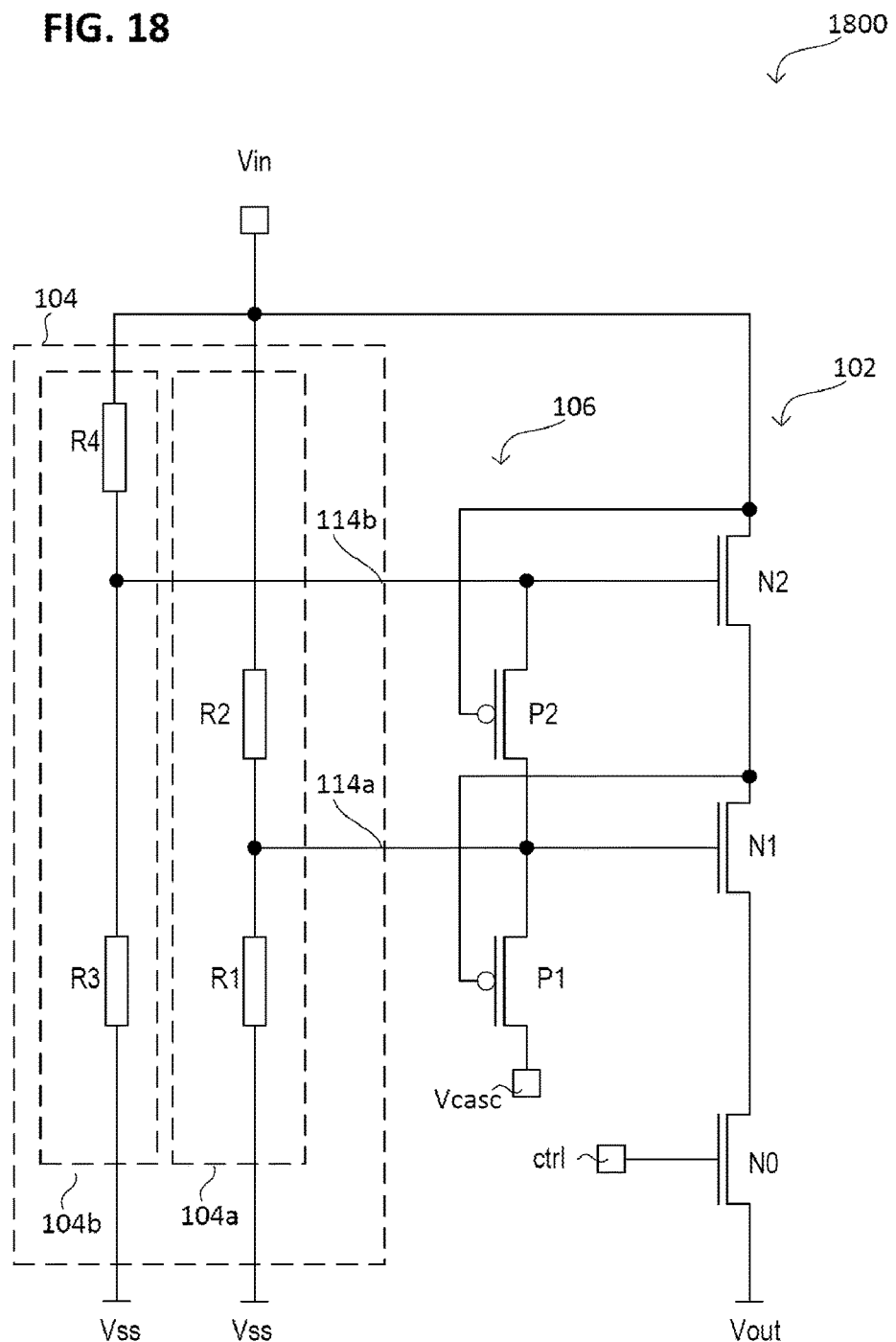

FIG. 18 illustrates a circuit 1800 according to various embodiments in a schematic circuit diagram.

The circuit 1800 can be similar to the circuits described above, wherein at least one or each voltage divider stage 104a, 104b of the voltage divider 104 can be connected in parallel with one another. The or each voltage divider stage 104a, 104b of the voltage divider 104 can be made available, for example, by means of ohmic resistors R1, R2, R3, R4.

Figure 19:
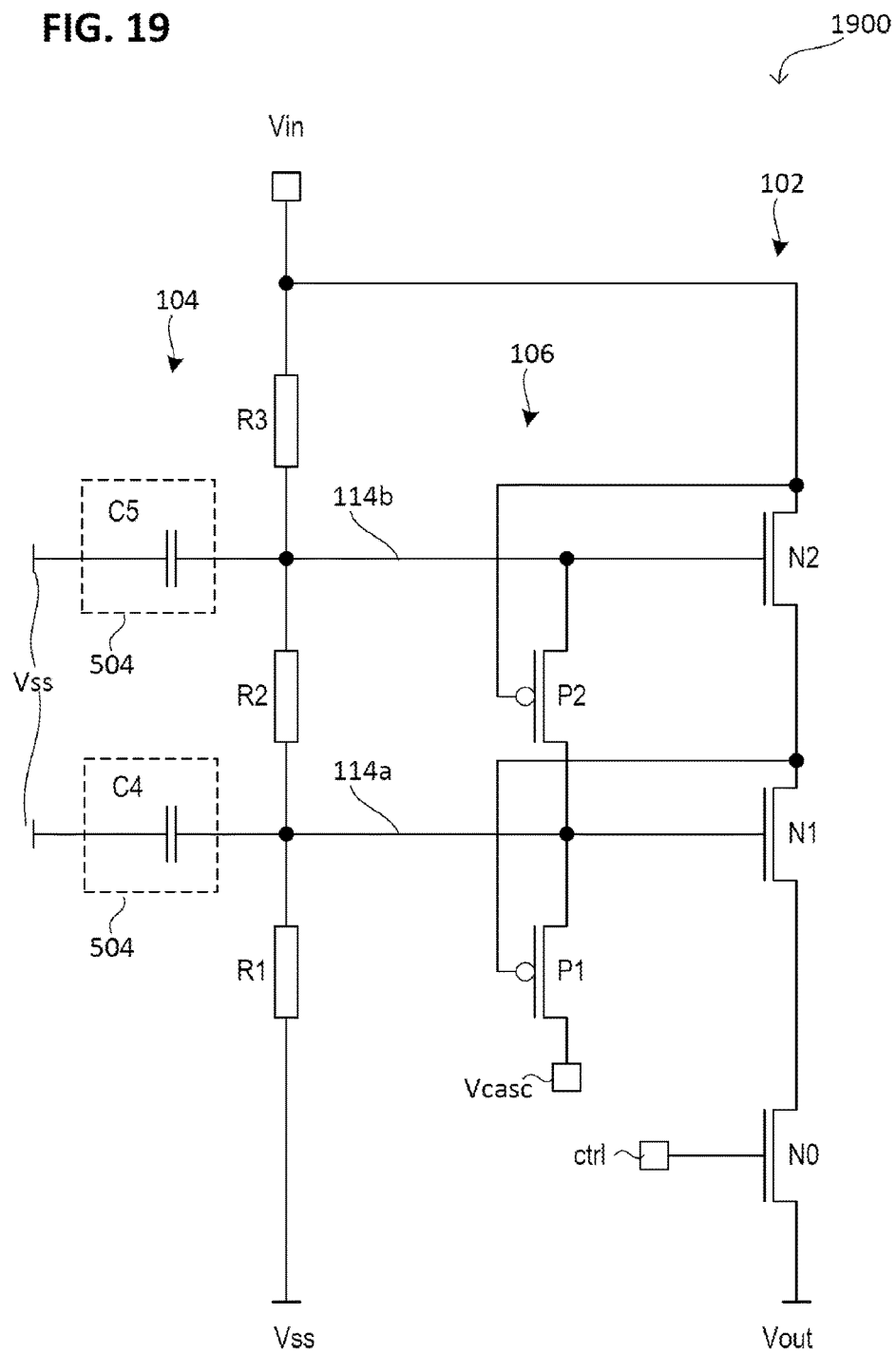

FIG. 19 illustrates a circuit 1900 according to various embodiments in a schematic circuit diagram.

The circuit 1900 can be similar to the circuits described above, wherein at least one or each voltage component output 114a, 114b of the voltage divider 104 can be coupled capacitively 504 to the reference potential Vss. The capacitive coupling of the at least one or of each voltage component output 114a, 114b can be made available by means of a capacitive element 504. For example, the capacitive element 504 of the or of each capacitive coupling may include a capacitor C4, C5 or be formed therefrom.

Figure 20:
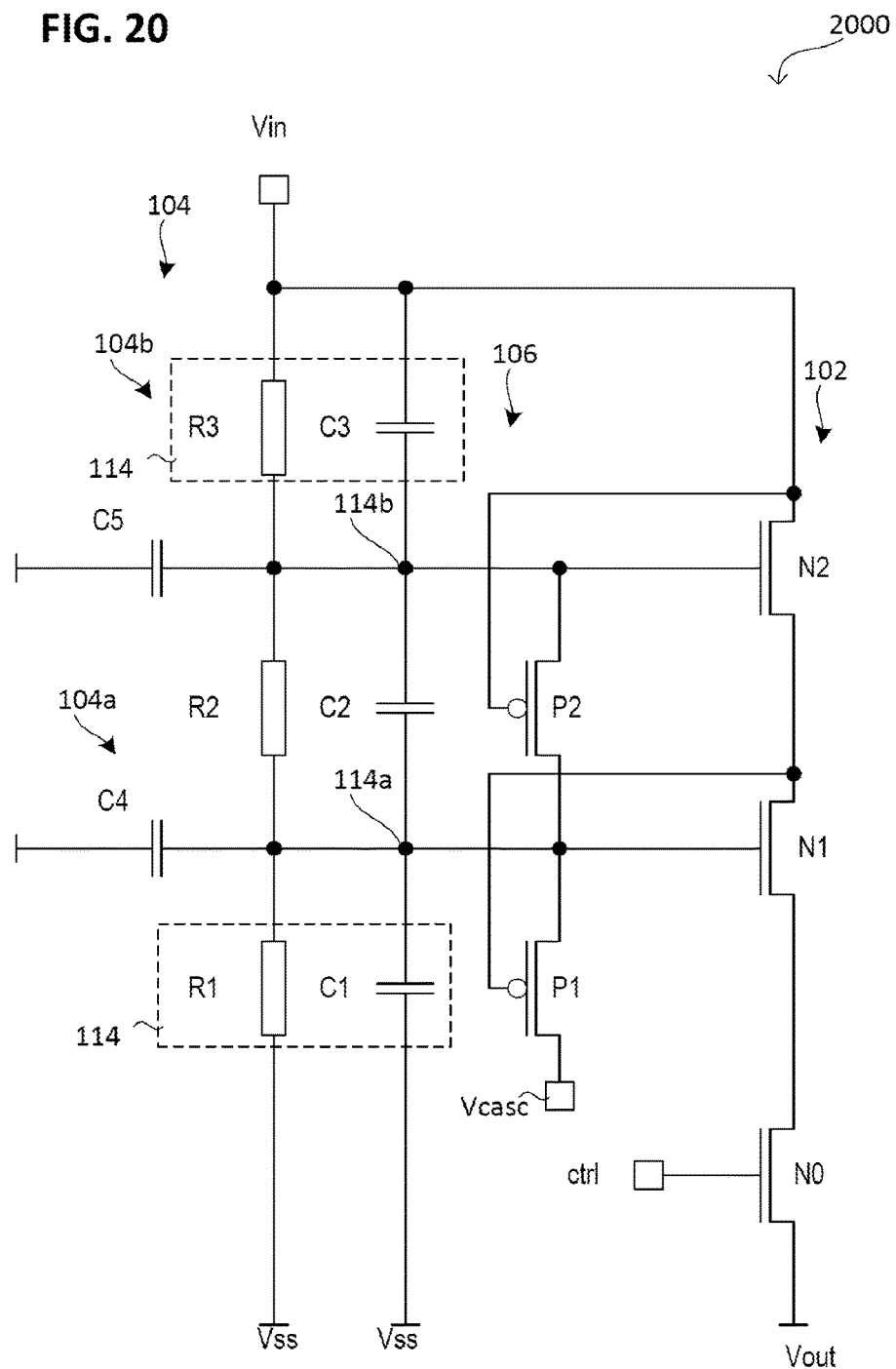
FIGS. 20 to 23 each show a circuit according to various embodiments in a schematic circuit diagram.

FIG. 20 illustrates a circuit 2000 according to various embodiments in a schematic circuit diagram.

The circuit 2000 can be similar to the circuits described above, wherein at least one or each voltage divider element 114 of the voltage divider 104 may include two electrical components R3, C3, R1, C1 which are connected in parallel and also differ, e.g. in at least their resistance, their capacitance and/or their inductance.

A rectifier element can be used alternatively or additionally to at least one or each capacitor C1, C2, C3 and/or to at least one or each ohmic resistor R1, R2, R3.

Figure 21:
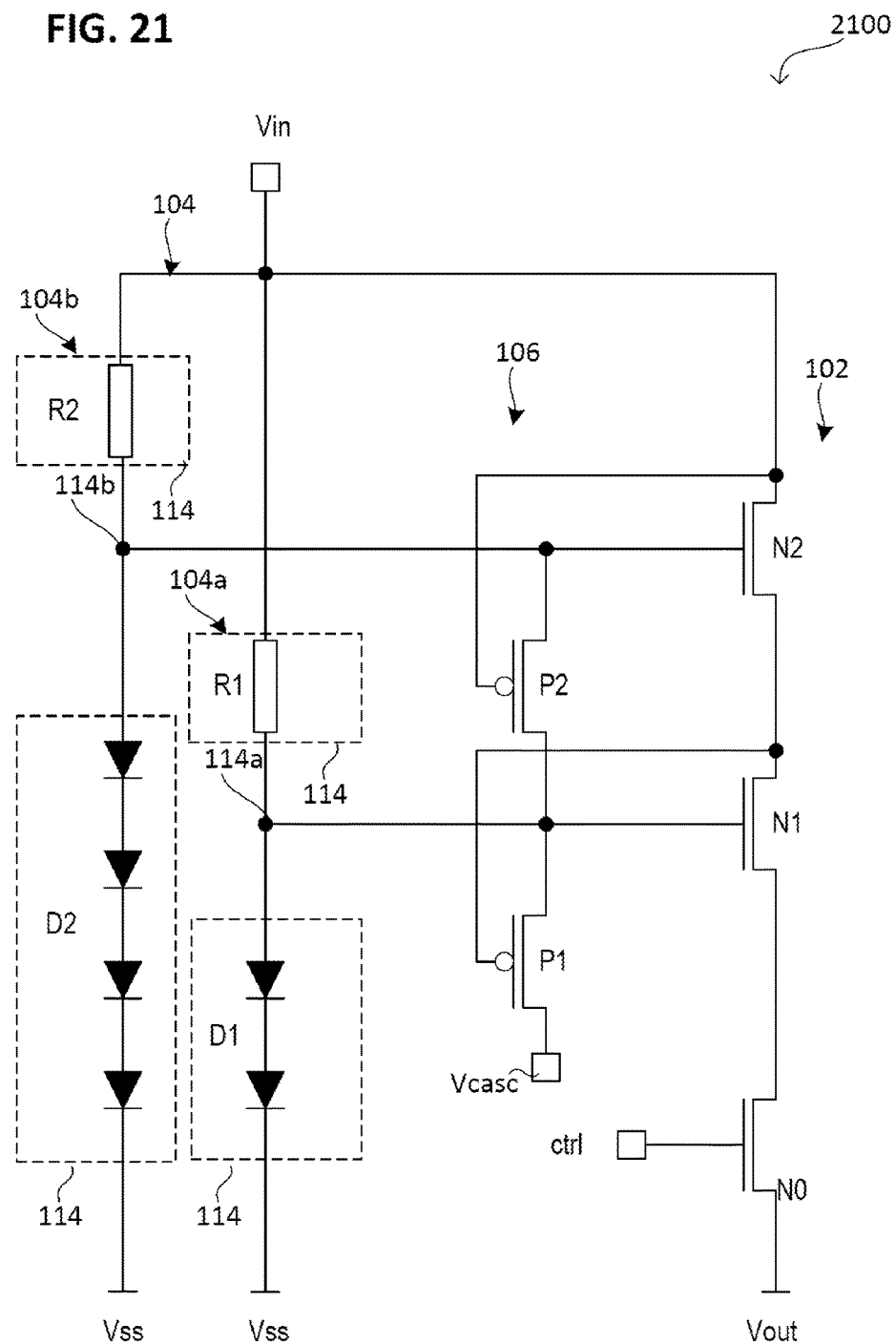

FIG. 21 illustrates a circuit 2100 according to various embodiments in a schematic circuit diagram.

The circuit 2100 can be similar to the circuits described above, wherein at least one or each voltage divider stage 104a, 104b of the voltage divider 104 may include two voltage divider elements 114 which are connected in series and also differ, e.g. in at least one of the following: the number of their electrical components R1, R2, D1, D2 and/or the electrical field direction dependence of their electrical impedance (e.g. their resistance, their capacitance and/or their inductance).

Alternatively or additionally, at least one or each voltage divider element 114 of the at least one or of each voltage divider stage 104a, 104b may include a plurality (e.g. two, three, four or more than four) of electrical components which are connected in series, or can be formed therefrom, such as e.g. a plurality of diodes D1, D2.

A rectifier element can be used alternatively or additionally to at least one or each diode D1, D2 and/or to at least one or each ohmic resistor R1, R2.

Figure 22:
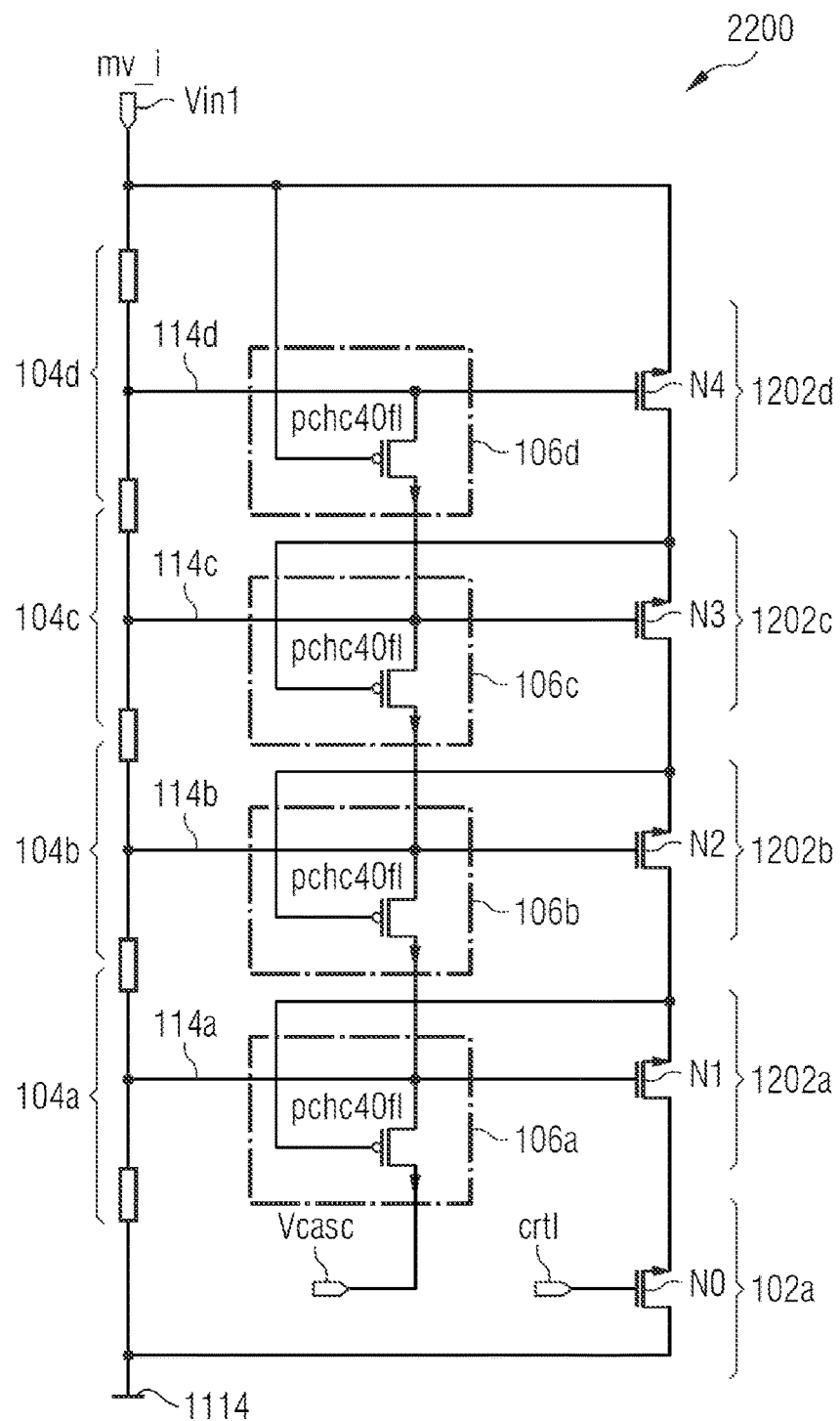

FIG. 22 illustrates a circuit 2200 according to various embodiments in a schematic circuit diagram.

The circuit 2200 can be similar to the circuits described above, wherein said circuit 2200 may include more than two (e.g. four) control stages 106a, 106b, 106c, 106d and for each control stage 106a, 106b, 106c, 106d may include precisely one voltage divider stage 104a, 104b, 104c, 104d assigned thereto and precisely one cascode stage 1202a, 1202b, 1202c, 1202d assigned thereto.

For example, the circuit 2200 may include a high side of an inverter or be formed therefrom (cf. FIG. 11A). Then, the circuit 2200 can be connected between the first input voltage Vin1 (e.g. the high voltage HV) and the output 1114 of the inverter.

If the drain voltage of the transistor P1 (e.g. PMOS transistor) of the first control stage 106a is lower than the difference between the auxiliary backup potential Vcasc and its threshold voltage Vth (i.e. if Vcasc–Vth), the first control stage 106a connects the gate or base of said transistor P1 to the auxiliary backup potential Vcasc. If the drain voltage rises, the transistor P1 of the first control stage 106a goes into a high-impedance state (e.g. said transistor P1 is opened) and its gate voltage or base voltage is defined by means of the voltage divider 104 (e.g. the assigned voltage divider stage 104a). A switching gap is therefore avoided.

In other words, the auxiliary backup potential Vcasc can be higher than the threshold value Vth.

In order to achieve a more rapid switching and/or a more rapid transient response, a capacitive element can be respectively connected in parallel with the resistor R1 of the first voltage divider stage 104a or in parallel with each resistor R1, R2, R3, R4, R5 of the voltage divider 104 (cf. FIG. 20).

Alternatively or additionally, protection against electrostatic discharge (ESD) can be achieved by connecting at least one diode, e.g. two, three or four diodes, in parallel with the resistor R1 of the first voltage divider stage 104a or in parallel with each resistor R1, R2, R3, R4, R5 of the voltage divider 104.

Figure 23:
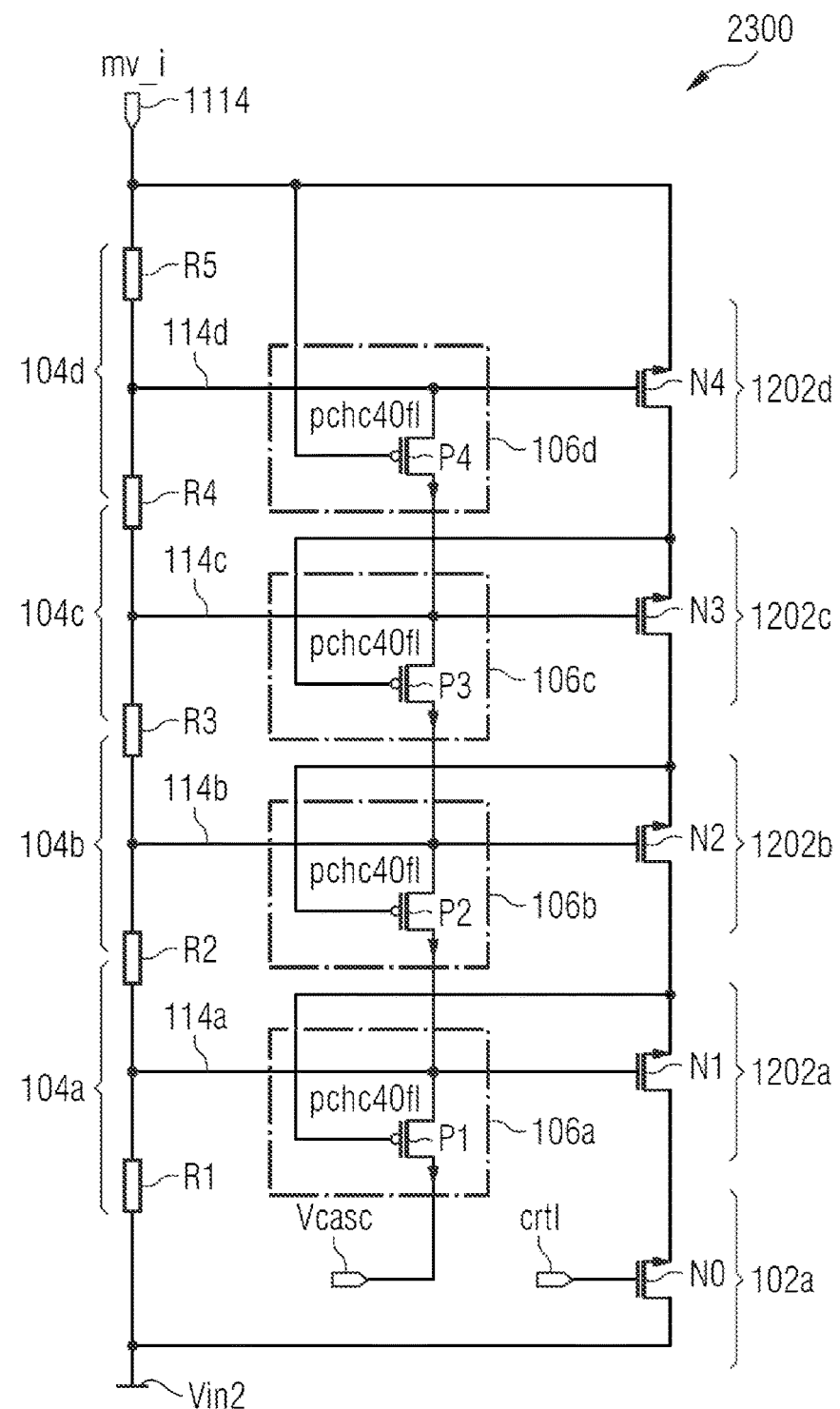

FIG. 23 illustrates a circuit 2300 according to various embodiments in a schematic circuit diagram.

The circuit 2300 can be similar to the circuits described above, wherein said circuit may include more than two (e.g. four) control stages 106a, 106b, 106c, 106d. In addition, the circuit 2300 may include precisely one voltage divider stage 104a, 104b, 104c, 104d assigned to the control stage and precisely one cascode stage 1202a, 1202b, 1202c, 1202d assigned to the control stage.

For example, the circuit 2300 may include a low side of an inverter or be formed therefrom (cf. FIG. 11A). The circuit 2300 can then be connected between the output 1114 of the inverter and the second input voltage Vin2. The second input voltage Vin2 can optionally be zero, i.e. be at reference potential Vss (e.g. electrical ground GND).

Figure 24:
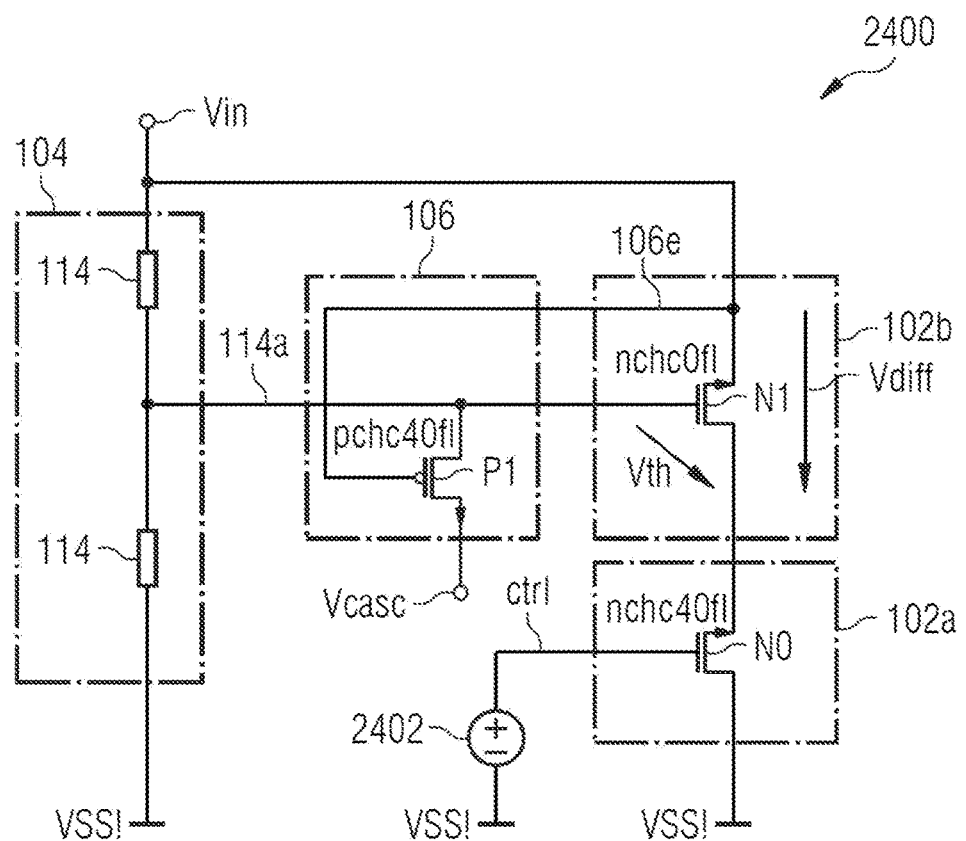
FIGS. 24 and 25 show a circuit according to various embodiments in a schematic circuit diagram.

FIG. 24 illustrates a circuit 2400 according to various embodiments in a schematic circuit diagram.

The controller 106 can be configured to switch the at least one cascode stage 102b according to a plurality of switched states, in a first switched state of which the auxiliary backup potential Vcasc can be present at the at least one cascode stage 102b; and in a second switched state of which a backup potential Vs1 which is made available by means of the voltage divider (also referred to as a first backup potential Vs1) can be present at the at least one cascode stage 102b.

The auxiliary backup potential Vcasc can be made available, for example, by means of the supply voltage VDD, e.g. can correspond thereto (for example approximately 1 volt). The auxiliary backup potential Vcasc and/or the supply voltage VDD can be lower than a peak-to-trough value of the input voltage Vin which is present at the voltage divider 104.

The switching input ctrl can be coupled to a signal generator 2402 by means of which a switching signal is input into said switching input ctrl.

In the first switched state, an input voltage Vin which is present at the voltage divider 104 can be lower than the difference between the auxiliary backup potential Vcasc and the threshold voltage Vth of the controller 106, e.g. the transistor P1 thereof. In other words, Vin<Vcasc–Vth can be the case, e.g. Vin can be approximately 0 volts. The auxiliary backup potential Vcasc can be higher than the voltage Vin which is present at the voltage divider 104 in the first switched state. In the first switched state, the auxiliary backup potential Vcasc (e.g. approximately 1 volt) can be applied to the at least one cascode stage 102b (e.g. the gate thereof) and/or to the voltage component output 114a by means of the controller 106. In the first switched state, a voltage Vdiff which drops across the at least one cascode stage 102b may be lower than the auxiliary backup potential Vcasc, e.g. approximately 0 volts.

In the second switched state, the voltage Vin which is present at the voltage divider 104 can be equal to or higher than the difference between the auxiliary backup potential Vcasc and the threshold voltage Vth of the controller 106, e.g. the transistor P1 thereof. In other words, Vin≥Vcasc–Vth may be the case, e.g. Vin can be approximately 2.5 volts. A divided-off backup potential Vs1 can then be applied to the at least one cascode stage 102b (e.g. the gate thereof). The divided-off backup potential Vs1 can be lower than the input voltage Vin which is present at the voltage divider 104 in the second switched state, e.g. half as large, e.g. 1.25 volts. Alternatively or additionally, in the second switched state the divided-off backup potential Vs1 can be higher than the auxiliary backup potential Vcasc. In the second switched state, a voltage Vdiff which drops across the at least one cascode state 102b can be approximately equal to the difference between the voltage Vin which is present at the voltage divider 104 and the divided-off backup potential Vs1 (reduced by the threshold voltage Vth). In other words, Vdiff=Vin–(Vs1–Vth) can be the case (e.g. approximately 1.25 volts or less), e.g. if the switching signal cascode stage 102a is closed.

The switching signal cascode stage 102a can optionally be switched between the first switched state and the second switched state, e.g. by means of the signal generator 2402.

Figure 25:
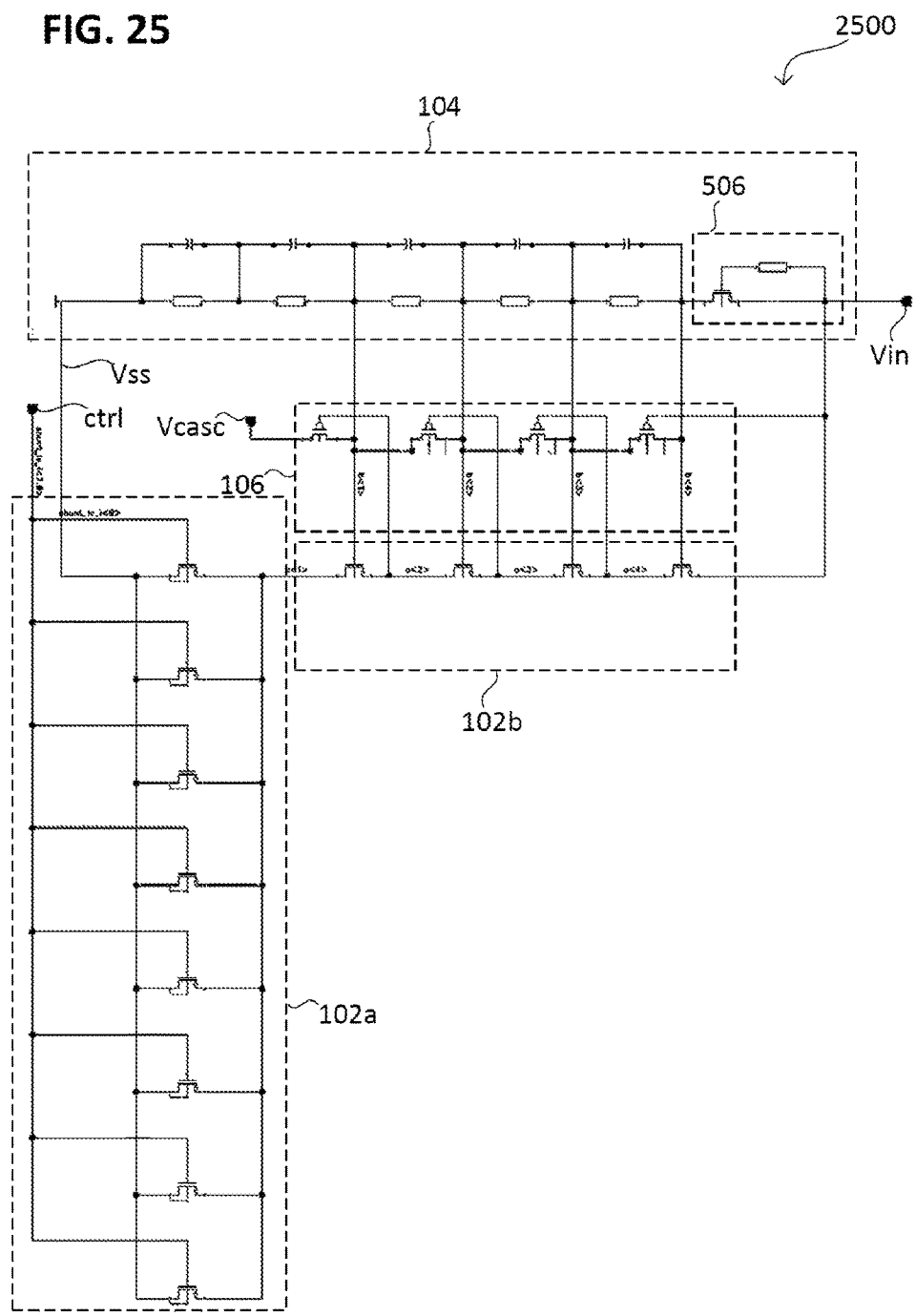

FIG. 25 illustrates a circuit 2500 according to various embodiments in a schematic circuit diagram.

The switching signal cascode stage 102a may include a plurality of transistors which are connected in parallel and which are connected between the at least one cascode stage 102b and the reference potential Vss.

According to various embodiments, at least one voltage divider element 114 may include a rectifier element 506 or be formed therefrom. The rectifier element 506 may include a transistor which is connected according to a diode configuration. This permits a lower power consumption of the circuit 2500, e.g. by reducing the flow of current.

Figure 26:
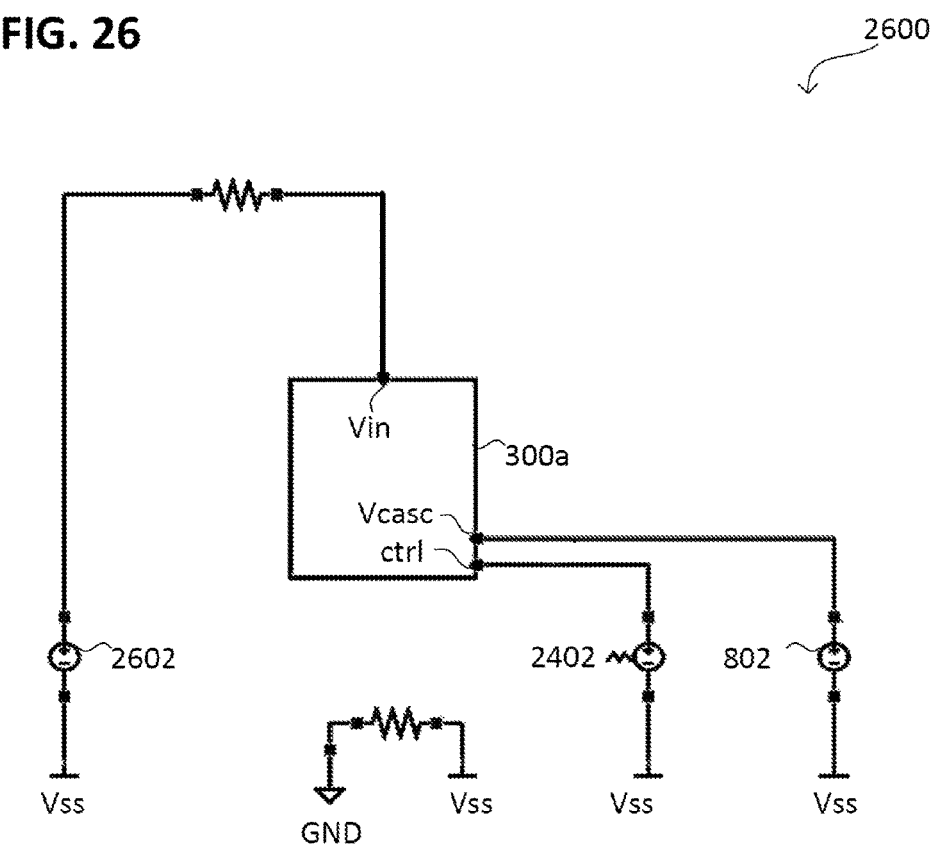
FIG. 26 shows a circuit arrangement according to various embodiments in a schematic circuit diagram.

FIG. 26 illustrates a circuit arrangement 2600 according to various embodiments in a schematic circuit diagram, e.g. an integrated circuit.

The circuit arrangement 2600 may include a circuit 300a (or some other circuit described herein) according to one or more embodiments.

The circuit arrangement 2600 may include a first voltage source 802 for generating the auxiliary backup potential Vcasc. The circuit arrangement 2600 can also have a second voltage source 2602 for generating the input voltage Vin (e.g. a high voltage HV), e.g. Vin>Vcasc. The input voltage Vin may include, for example, a mixed voltage with a higher peak-to-trough value than the auxiliary backup potential Vcasc. In addition, the circuit arrangement 2600 may include a signal generator 2402 for generating the switching signal which is input into the switching input ctrl. The reference potential Vss can optionally differ from the electrical ground GND.

Figure 27:
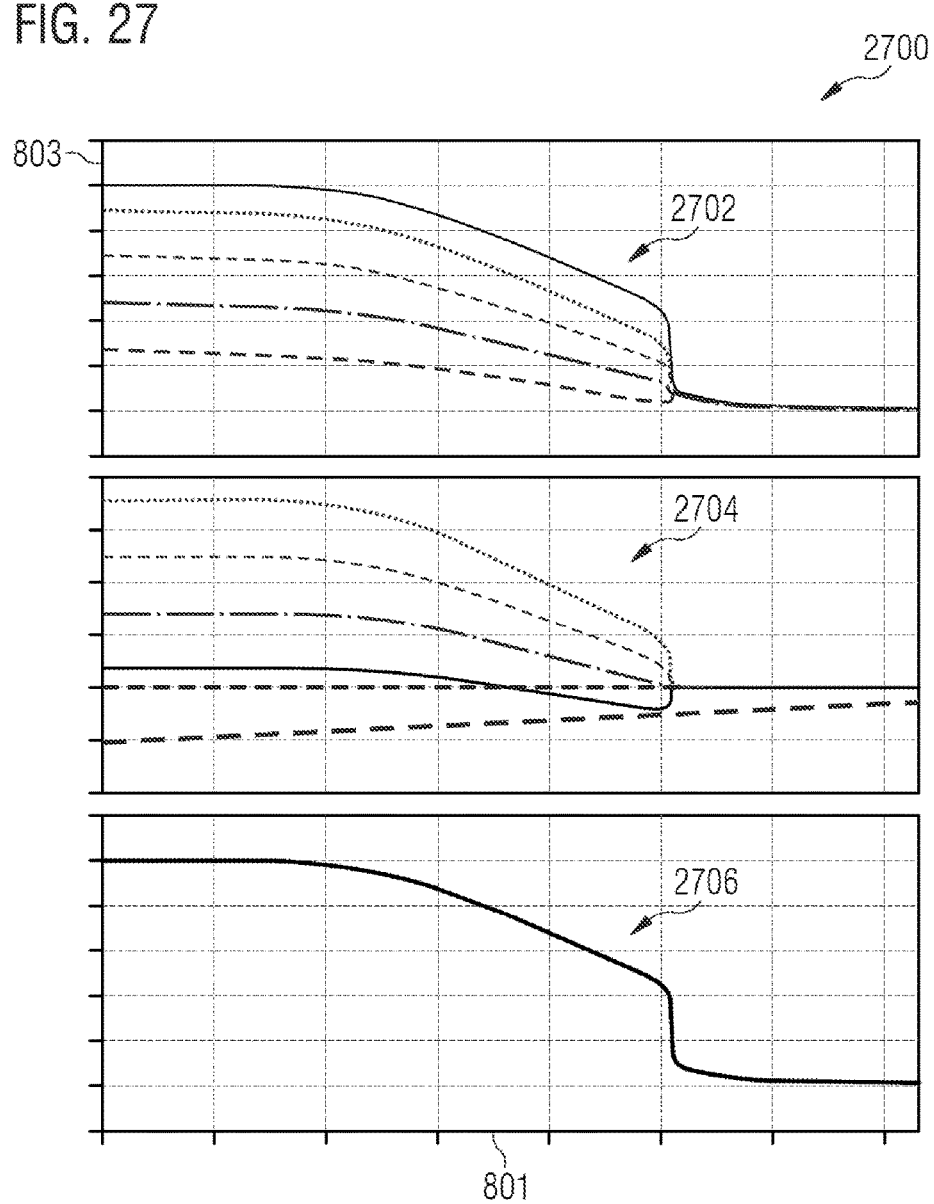
FIG. 27 shows a voltage profile in a schematic diagram according to various embodiments.

FIG. 27 illustrates a voltage profile in a schematic diagram 2700 according to various embodiments, which voltage profile represents an electrical variable 803 (e.g. current or voltage) plotted over time 801. The drain voltages 2702 of the cascode stages of the cascode circuit, the gate voltages 2704 of the cascode stages of the cascode circuit 102 and the current 2706 through the cascode circuit 102 are represented in the diagram 2700.

Figure 28:
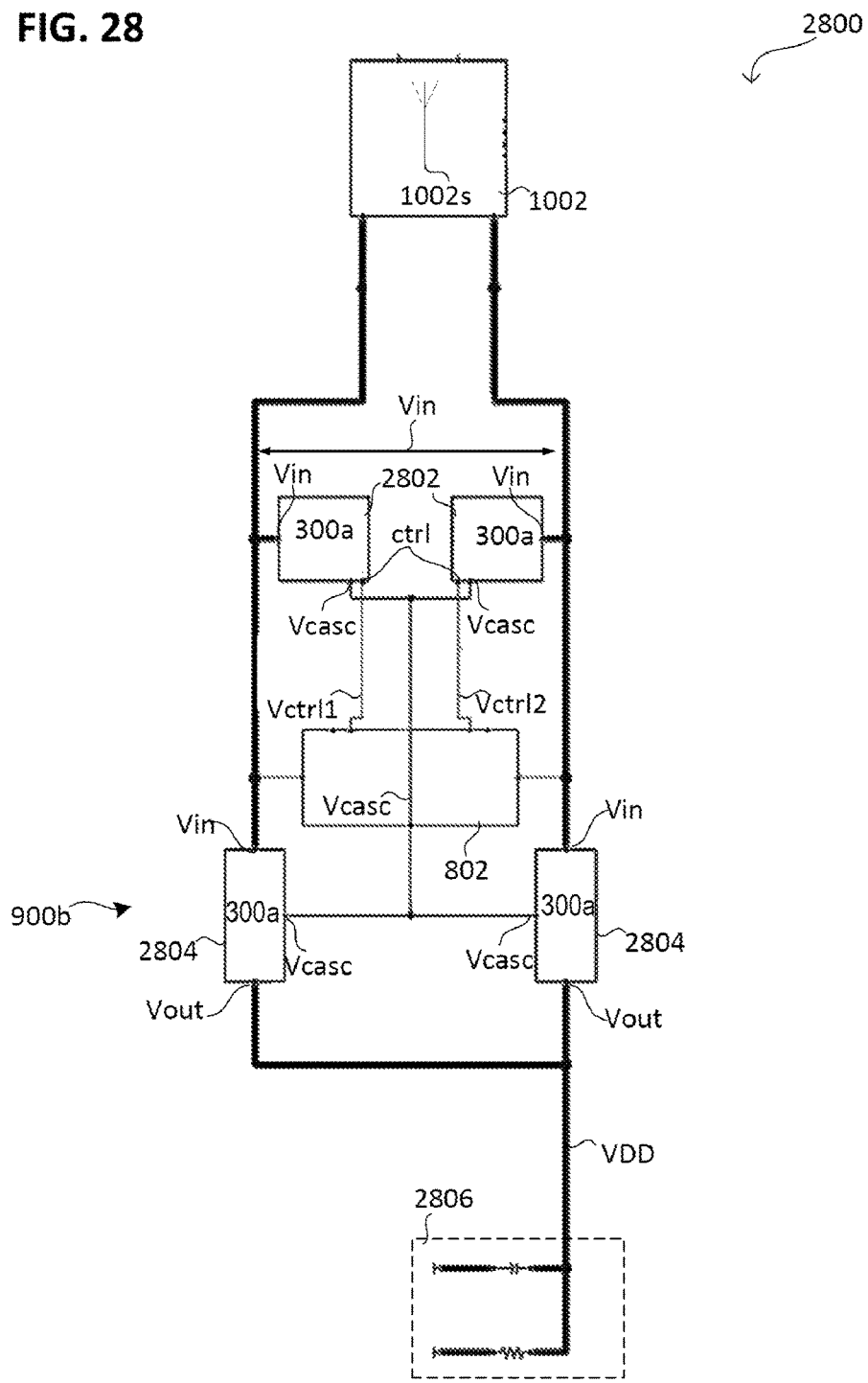
FIG. 28 shows a circuit arrangement according to various embodiments in a schematic circuit diagram.

FIG. 28 illustrates a circuit arrangement 2800 according to various embodiments in a schematic circuit diagram, e.g. an integrated circuit. The circuit arrangement 2800 can be, for example, part of a chip card, e.g. of a contactless communication chip card.

The circuit arrangement 2800 may include a plurality of circuits 300a (or other circuits described herein) according to one or more embodiments, e.g. two first circuits 2802 and two additional first circuits 2804. In addition, the circuit arrangement 2800 may include a voltage source 802 which can be configured, for example, as described above.

The voltage source 802 can be configured to generate the auxiliary backup potential Vcasc and to input the latter into the two first circuits 2802 and/or the two second circuits 2804. The voltage source 802 may include, for example, a charging pump or be formed therefrom. The auxiliary backup potential Vcasc which is made available by means of the voltage source 802 can optionally be fed to a consumer 2806, e.g. a chip logic or a processor, in order to supply it.

The second circuit 1002 can be configured for contactless communication. For example, the second circuit 1002 may include a contactless interface 1002s, e.g. an antenna, or be formed therefrom. The second circuit 1002 can generate a mixed voltage Vin, e.g. a high mixed voltage.

The voltage source 802 can also be configured to generate two switching signals Vctrl1, Vctrl2, each switching signal Vctrl1, Vctrl2 of which can be input into a circuit 300a of the two first circuits 2802, e.g. by means of the switching input ctrl thereof. The two switching signals Vctrl1, Vctrl2 can be configured, for example, in differential mode with respect to one another. Alternatively or additionally, the two switching signals Vctrl1, Vctrl2 can be configured to switch over the two first circuits 2802 with the clock cycle of an equivalent value crossing (e.g. a change of polarity) of the mixed voltage.

The two first circuits 2802 can be coupled in the differential mode and/or can alternately couple a half wave of the mixed voltage Vin to a reference potential (e.g. electrical ground GND) by means of the two switching signals Vctrl1, Vctrl2. This permits rectification of the voltage which is present at Vin to be carried out.

Two additional first circuits 2804 can be connected between the second circuit 1002 and the consumer 2806, e.g. a chip logic or a processor. The two additional first circuits 2804 can be connected in a diode configuration. In a diode configuration, said circuits 2804 can be configured to rectify the voltage which is generated by means of the second circuit 1002. In other words, the two additional first circuits 2804 can be part of a rectifier circuit 2800b or form said rectifier circuit 2800b.

According to various embodiments, the chip logic can be operated by means of a clock frequency. The clock frequency of the chip logic can be, for example, higher than approximately 1 kHz (kilohertz), e.g. higher than approximately 10 kHz, e.g. higher than approximately 100 kHz, e.g. higher than approximately 1 MHz (megahertz). In order to synchronize a plurality of logic modules it is possible to exchange a clock signal clk between them. The or each clock signal may include a mixed voltage, e.g. with a constant frequency (also referred to as a clock frequency).

The mixed voltage (also referred to as an antenna voltage) can be bypassed and amplified by means of the circuit arrangement 2800, with the result that a suitable supply voltage VDD for supplying the consumer 2806 can be generated by means of the circuit arrangement 2800.

Figure 29:
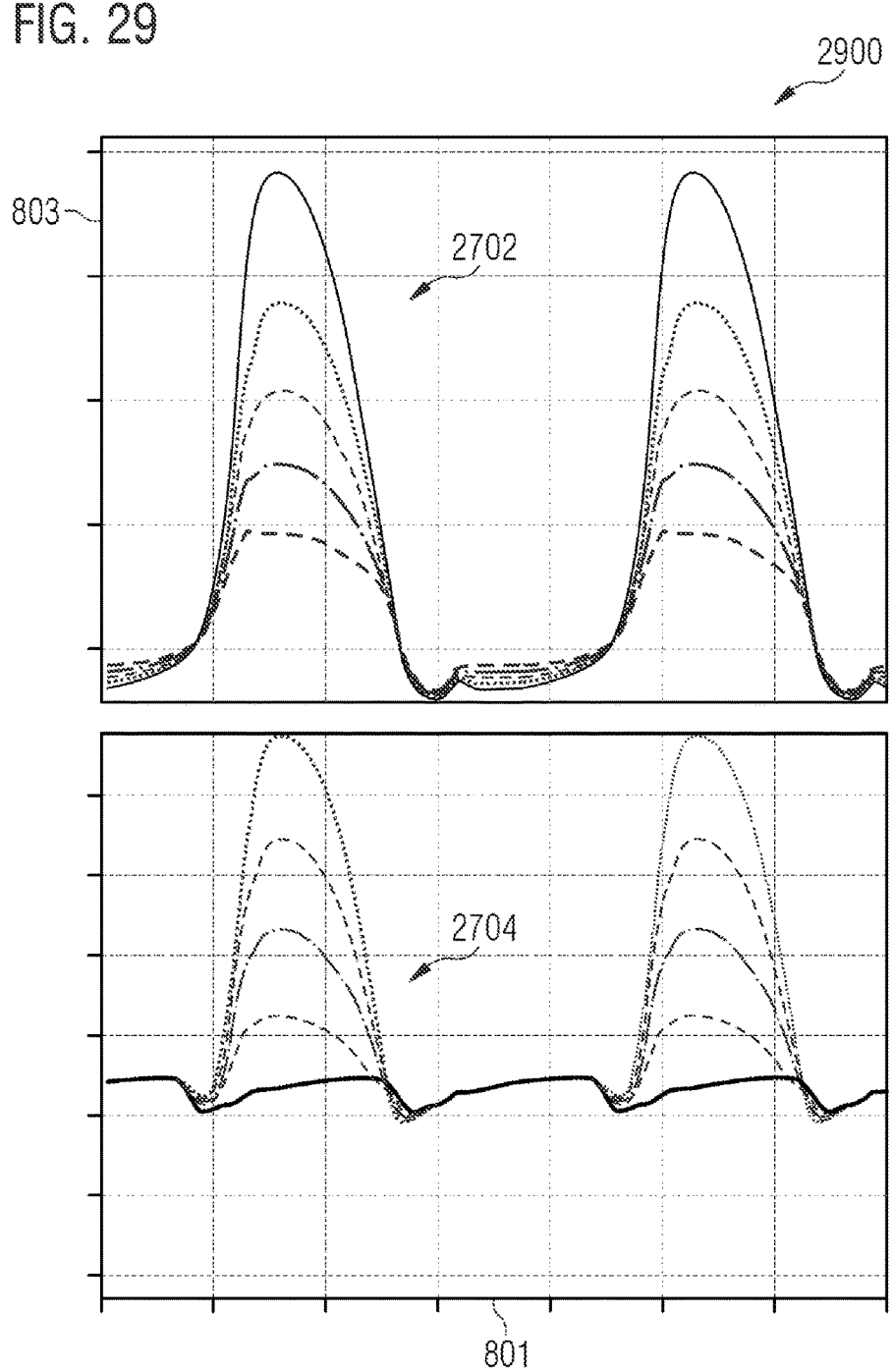
FIG. 29 shows a voltage profile in a schematic diagram according to various embodiments.

FIG. 29 illustrates a voltage profile in a schematic diagram 2900 according to various embodiments, which profile represents an electrical variable 803 (e.g. current or voltage) plotted over time 801. The drain voltages 2702 of the cascode stages of the circuit arrangement 2800 and the gate voltages 2704 of the cascode stages of the circuit arrangement 2800 are represented in the diagram 2900.

FIG. 30 illustrates a method 3000 for operating a circuit according to various embodiments in a schematic flowchart.

According to various embodiments, the method 3000 can optionally include in 3001: inputting a switching signal into a cascode stage of the plurality of cascode stages, e.g. into the switching input ctrl of the switching signal cascode stage. The plurality of cascode stages can be connected through by means of the switching signal.

The method 3000 may include in 3003: dividing off a backup potential from a voltage which is present at the circuit, by means of a voltage divider stage.

The method 3000 can also include in 3005: inputting the backup potential into at least one cascode stage.

The method 3000 can also include in 3007: bypassing the voltage divider stage if the voltage satisfies a predefined criterion.

According to various embodiments, a circuit and a method are made available which reduce the required resilience of the electrical components (e.g. transistors) compared to electrical loading (e.g. compared to an electrical voltage). According to various embodiments, a switched gate voltage (e.g. by means of a backup potential) can clearly be used to reduce the required resilience of the electrical components.

According to various embodiments, a switching gap can be avoided. To do this, an electrical auxiliary backup potential can be input into one or each cascode stage if a voltage which is applied to the respective cascode stage satisfies a predefined criterion, e.g. is equal to a threshold value or lower.

According to various embodiments, the switchable gate voltage and/or the number of cascoded switches (e.g. each making available a cascode stage) can be increased and/or a switching gap can be avoided. To do this, a divided off voltage is input into one or each cascode stage if the voltage present at the respective cascode stage does not satisfy the predefined criterion.

According to various embodiments, a circuit (e.g. having a cascode circuit or formed therefrom) may include the following: a plurality of cascode stages connected in series with one another; a voltage divider which is connected in parallel with the plurality of cascode stages and is coupled to the cascode stages in order to make available a first electrical backup potential at least one cascode stage of the plurality of cascode stages; a controller which is configured to couple the at least one cascode stage of the plurality of cascode stages to a predefined second electrical backup potential if a voltage which is present at the voltage divider satisfies a predefined criterion.

According to various embodiments, the circuit may include a switching input for switching the plurality of cascode stages.

According to various embodiments, an additional cascode stage of the plurality of cascode stages may include a switch which can be switched by means of the switching input.

According to various embodiments, the additional cascode stage may include a common-source or common-emitter transistor whose gate or base is coupled to the switching input.

According to various embodiments, the voltage divider may include at least one resistive voltage divider stage and/or at least one capacitive voltage divider stage or be formed therefrom.

According to various embodiments, at least one voltage divider stage of the voltage divider may include a diode or be formed therefrom.

According to various embodiments, the voltage divider may include at least two voltage divider stages which are connected in parallel or be formed therefrom.

According to various embodiments, the voltage divider may include, or be formed from, at least one voltage divider stage which is capacitively coupled to a reference potential.

According to various embodiments, the circuit can also have a voltage source which is configured to make available the second backup potential.

According to various embodiments, the second backup potential may include less fluctuation (e.g. a lower peak-to-trough value) than the voltage which is present at the voltage divider and/or than the first backup potential.

According to various embodiments, the first backup potential can be divided off from the potential difference by means of the voltage divider.

According to various embodiments the at least one cascode stage may include, or be formed from a switch which is configured to switch, by means of the backup potential, whichever of the at least one cascode stage is respectively coupled.

According to various embodiments, the at least one cascode stage may include, or be formed from, a transistor in gate connection mode or base connection mode (for example the gate or base of which can be coupled to the voltage divider).

According to various embodiments, a rectifier circuit may include a circuit according to one or more embodiments.

According to various embodiments, the rectifier circuit may include a plurality of rectifier branches, each of which has a circuit according to one or more embodiments.

According to various embodiments, a voltage source may include a circuit according to one or more embodiments.

According to various embodiments, a circuit arrangement may include the following: a first circuit according to one or more embodiments, a second circuit which is configured for contactless communication and is coupled to the first circuit, e.g. for transmitting signals between the two circuits.

According to various embodiments, an inverter may include a circuit according to one or more embodiments.

According to various embodiments, the inverter can be based on NMOS technology (n-channel MOS technology) and/or on PMOS technology (p-channel MOS technology).

According to various embodiments, the inverter can be based on CMOS technology (i.e. an inverter in complementary metal-oxide semiconductor technology).

According to various embodiments, a circuit may include the following: a first cascode stage and a second cascode stage; a voltage divider which is connected in parallel with the first cascode stage and the second cascode stage and has a first voltage divider stage which is coupled to the first cascode stage, and has a second voltage divider stage which is coupled to the second cascode stage; a controller which is configured to bypass the first voltage divider stage and/or the second voltage divider stage if a voltage which is present at the voltage divider satisfies a predefined criterion.

According to various embodiments, a circuit may include the following: a first cascode stage and a second cascode stage; a voltage divider which is connected in parallel with the first cascode stage and the second cascode stage and has a first voltage component output which is coupled to the first cascode stage, and a second voltage component output which is coupled to the second cascode stage; a controller which is configured to couple the first voltage component output to the second voltage component output if a voltage at the first voltage component output and/or at the second voltage component output satisfies a predefined criterion.

The coupling of the first voltage component output to the second voltage component output can clearly include at least one voltage divider stage (e.g. one, more or each voltage divider stage) to bypass. Therefore, the number of voltage divider stages can clearly be reduced, with the result that a higher voltage is input into the cascode stages, e.g. in order to compensate a drop in the voltage which is present at the voltage divider. The bypassing of the voltage divider stages can alternatively take place in a different way, e.g. by the voltage divider elements 114 thereof being changed and/or bridged.

According to various embodiments, a method for operating a circuit which includes a plurality of cascode stages may include the following: coupling at least one cascode stage of the plurality of cascode stages to a predefined backup potential if a voltage which is present at the circuit satisfies a predefined criterion; and otherwise coupling the at least one cascode stage to a backup potential which is divided off from the voltage.

According to various embodiments, a method for operating a circuit which includes at least one cascode stage and a voltage divider stage may include the following: dividing off a backup potential from a voltage which is present at the circuit, by means of the voltage divider stage; inputting the backup potential into the at least one cascode stage; and bypassing the voltage divider stage if the voltage satisfies a predefined criterion.

According to various embodiments, the method can also include the following: inputting a switching signal into an additional cascode stage of the plurality of cascode stages.

According to various embodiments, a circuit may include the following: at least one cascode stage which has a transistor in gate connection mode or base connection mode; an additional cascode stage which has a transistor in source connection mode or emitter connection mode, a voltage divider which is configured to divide off a voltage component from a voltage of the circuit which is present at said voltage divider, and to input it into a gate of the at least one cascode stage; a controller which is configured to couple the gate of the at least one cascode stage to a predefined backup potential if the voltage which is present at the voltage divider satisfies a predefined criterion.

According to various embodiments, a circuit may include the following: a plurality of cascode stages, a first cascode stage of which has a switching input for switching the circuit; a potential regulator which is configured to couple at least one second cascode stage of the plurality of cascode stages to a backup potential if a potential difference across the plurality of cascode stages satisfies a predefined criterion, and otherwise to couple it to a backup potential which is divided off from the potential difference.

According to various embodiments, the potential regulator may include a voltage divider which is connected in parallel with the plurality of cascode stages and is configured to divide off the backup potential. For example, the voltage divider can make available the divided-off backup potential on the output side. The potential regulator can be configured to input the divided-off backup potential into the plurality of cascode stages (e.g. into one or each cascode stage).

According to various embodiments, a circuit may include the following: a plurality of cascode stages which are connected in series with one another; a voltage divider which is connected in parallel with the plurality of cascode stages and is coupled to the cascode stages in order to make available a first electrical backup potential at least one cascode stage of the plurality of cascode stages; a controller which is configured to couple the at least one cascode stage to a predefined second electrical backup potential if a voltage which is present at the voltage divider satisfies a predefined criterion.

According to various embodiments, a circuit may include the following: a plurality of cascode stages which are connected in series with one another; a voltage divider which is connected in parallel with the plurality of cascode stages and is coupled to the cascode stages in order to input a first electrical backup potential into at least one cascode stage of the plurality of cascode stages; a controller which is configured to input a predefined second electrical backup potential into the at least one cascode stage if a voltage which is present at the voltage divider satisfies a predefined criterion.

According to various embodiments, the voltage divider can be coupled on the output side (i.e. by means of one or each voltage component output) to the at least one cascode stage of the plurality of cascode stages.

According to various embodiments, the controller can be configured to couple the voltage divider on the output side to the predefined second backup potential if the voltage which is present at the voltage divider satisfies a predefined criterion.

According to various embodiments, the switching input can be coupled to an additional cascode stage of the plurality of cascode stages, e.g. to the gate thereof.

According to various embodiments, a cascode circuit may include, or be formed from, a plurality of cascode stages.

According to various embodiments, a method for operating a circuit which has a plurality of cascode stages may include the following: dividing off a first backup potential from a voltage which is present at the circuit; making available a second backup potential which is different from the voltage which is present at the circuit (e.g. independent in terms of timing); coupling at least one cascode stage of the plurality of cascode stages to the second backup potential if the voltage which is present at the circuit satisfies a predefined criterion; and otherwise coupling the at least one cascode stage to the first backup potential.

According to various embodiments, the method can also include the following: inputting a switching signal into an additional cascode stage of the plurality of cascode stages.

According to various embodiments, the circuit (e.g. or at least the cascode circuit) can be integrated into a substrate. In other words, the circuit can be an integrated circuit, e.g. a semiconductor circuit. Alternatively or additionally, at least the cascode circuit can be an integrated circuit, e.g. a semiconductor circuit.

According to various embodiments, one or each electrical component of the circuit or of the cascode circuit can be integrated into a substrate or at least into a semiconductor area.

According to various embodiments, the at least one cascode stage can be connected between the voltage which is present at the voltage divider and the additional cascode stage.

According to various embodiments, the controller can be connected between the voltage which is present at the voltage divider and the predefined second backup potential.

According to various embodiments, the at least one cascode stage may include one cascode stage or a plurality of cascode stages.

According to various embodiments, the voltage divider may include a plurality of voltage divider stages, of which each voltage divider stage is assigned to precisely one cascode stage of the at least one cascode stage. Each voltage divider stage can be configured to supply the cascode stage assigned to it of the at least one cascode stage, with a divided-off first backup potential (e.g. from a first backup potential which is divided off from a voltage which is present at the voltage divider). In other words, the voltage divider can make available a plurality of first backup potentials, each of which is made available by means of a voltage divider stage. The plurality of first backup potentials can be different from one another.

According to various embodiments, the controller may include a plurality of control stages, of which each control stage is assigned to precisely one cascode stage of the at least one cascode stage. Each cascode stage can be configured to supply the cascode stage assigned to it, of the at least one cascode stage, with a predefined second backup potential.

In general, the or each first backup potential can depend on the voltage which is present at the voltage divider, i.e. also on its variance over time. The second backup potential may include a lower variability over time than the voltage which is present at the voltage divider and/or than the or each first backup potential, e.g. a lower frequency and/or a lower peak-to-trough value.

According to various embodiments, the controller can be configured to bypass at least one voltage divider stage if the voltage which is present at the voltage divider satisfies the predefined criterion.

According to various embodiments, the controller can be configured to couple the at least one cascode stage of the plurality of cascode stages to the predefined second electrical backup potential if a difference between the first backup voltage and the voltage which is present at the voltage divider satisfies the predefined criterion, e.g. if the difference is smaller than a threshold voltage of the at least one cascode stage and/or if the difference is smaller than a required gate-source voltage of the at least one cascode stage. The threshold voltage can denote a voltage for switching the at least one cascode stage.

According to various embodiments, the voltage which is present at the voltage divider (also referred to as the input voltage) can be a voltage which is variable over time, e.g. a mixed voltage. A mixed voltage may include an alternating voltage and optionally a direct voltage or can be formed therefrom, for example a sum voltage composed of the alternating voltage and direct voltage or just an alternating voltage.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit, comprising:
a plurality of cascode stages connected in series with one another;
a voltage divider which is connected in parallel with the plurality of cascode stages and is coupled to the cascode stages in order to make available a first electrical backup potential to at least one cascode stage of the plurality of cascode stages; and
a controller which is configured to couple the at least one cascode stage of the plurality of cascode stages to a predefined second electrical backup potential if a voltage which is present at the voltage divider satisfies a predefined criterion;
wherein the controller comprises at least one switch, which is configured to supply the second electrical backup to the at least one cascode stage;
wherein the controller is further configured to bypass a first voltage divider stage and/or the second voltage divider stage using the at least one switch, if a voltage which is present at the voltage divider satisfies a predefined criterion; and
wherein the second electrical backup potential is different from the first electrical backup potential.

2. The circuit of claim 1, further comprising:
a switching input for switching the plurality of cascode stages.

3. The circuit of claim 2,
wherein an additional cascode stage of the plurality of cascode stages comprises a switch which can be switched by the switching input.

4. The circuit of claim 3,
wherein the additional cascode stage comprises a common-source or common-emitter transistor whose gate or base makes available the switching input.

5. The circuit of claim 1,
wherein the voltage divider comprises at least one of at least one resistive voltage divider stage or at least one capacitive voltage divider stage.

6. The circuit of claim 1,
wherein at least one voltage divider stage of the voltage divider comprises a diode.

7. The circuit of claim 1,
wherein the voltage divider comprises at least two voltage divider stages which are connected in parallel.

8. The circuit of claim 1,
wherein the voltage divider comprises at least one voltage divider stage which is capacitively coupled to a reference potential.

9. The circuit of claim 1, further comprising:
a voltage source, which is configured to make available the second backup potential.

10. The circuit of claim 1,
wherein the second backup potential comprises less fluctuation than the voltage which is present at the voltage divider; or
wherein by the voltage divider the first backup potential is divided off from the voltage which is present at the voltage divider.

11. The circuit of claim 1,
wherein the at least one cascode stage comprises a switch which is configured to switch, by means of the backup potential, whichever of the at least one cascode stage is respectively coupled.

12. The circuit of claim 1,
wherein the at least one cascode stage comprises a transistor in gate connection mode or base connection mode, the gate or base of which is coupled to the voltage divider.

13. A rectifier circuit, comprising:
a circuit, comprising:
a plurality of cascode stages connected in series with one another;
a voltage divider which is connected in parallel with the plurality of cascode stages and is coupled to the cascode stages in order to make available a first electrical backup potential to at least one cascode stage of the plurality of cascode stages; and
a controller which is configured to couple the at least one cascode stage of the plurality of cascode stages to a predefined second electrical backup potential if a voltage which is present at the voltage divider satisfies a predefined criterion
wherein the controller comprises at least one switch, which is configured to supply the second electrical backup to the at least one cascode stage;
wherein the controller is further configured to bypass a first voltage divider stage and/or the second voltage divider stage using the at least one switch, if a voltage which is present at the voltage divider satisfies a predefined criterion; and
wherein the second electrical backup potential is different from the first electrical backup potential.

14. A voltage source, comprising:
a circuit, comprising:
a plurality of cascode stages connected in series with one another;
a voltage divider which is connected in parallel with the plurality of cascode stages and is coupled to the cascode stages in order to make available a first electrical backup potential to at least one cascode stage of the plurality of cascode stages; and
a controller which is configured to couple the at least one cascode stage of the plurality of cascode stages to a predefined second electrical backup potential if a voltage which is present at the voltage divider satisfies a predefined criterion
wherein the controller comprises at least one switch, which is configured to supply the second electrical backup to the at least one cascode stage;
wherein the controller is further configured to bypass a first voltage divider stage and/or the second voltage divider stage using the at least one switch, if a voltage which is present at the voltage divider satisfies a predefined criterion; and
wherein the second electrical backup potential is different from the first electrical backup potential.

15. A circuit arrangement, comprising:
a first circuit, comprising:

a plurality of cascode stages connected in series with one another;

a voltage divider which is connected in parallel with the plurality of cascode stages and is coupled to the cascode stages in order to make available a first electrical backup potential to at least one cascode stage of the plurality of cascode stages; and a controller which is configured to couple the at least one cascode stage of the plurality of cascode stages to a predefined second electrical backup potential if a voltage which is present at the voltage divider satisfies a predefined criterion;

a second circuit which is configured for contactless communication and is coupled to the first circuit wherein the controller comprises at least one switch, which is configured to supply the second electrical backup to the at least one cascode stage;

wherein the controller is further configured to bypass a first voltage divider stage and/or the second voltage divider stage using the at least one switch, if a voltage which is present at the voltage divider satisfies a predefined criterion; and wherein the second electrical backup potential is different from the first electrical backup potential.

16. An inverter, comprising:

a circuit, comprising:

a plurality of cascode stages connected in series with one another;

a voltage divider which is connected in parallel with the plurality of cascode stages and is coupled to the cascode stages in order to make available a first electrical backup potential to at least one cascode stage of the plurality of cascode stages; and a controller which is configured to couple the at least one cascode stage of the plurality of cascode stages to a predefined second electrical backup potential if a voltage which is present at the voltage divider satisfies a predefined criterion;

wherein the controller comprises at least one switch, which is configured to supply the second electrical backup to the at least one cascode stage;

wherein the controller is further configured to bypass a first voltage divider stage and/or the second voltage divider stage using the at least one switch, if a voltage which is present at the voltage divider satisfies a predefined criterion; and wherein the second electrical backup potential is different from the first electrical backup potential.

17. A circuit, comprising:

a first cascode stage and a second cascode stage;

a voltage divider which is connected in parallel with the first cascode stage and the second cascode stage and has a first voltage component output which is coupled to the first cascode stage, and a second voltage component output which is coupled to the second cascode stage;

a controller which is configured to couple the first voltage component output to the second voltage component output if a voltage at least one of at the first voltage component output or at the second voltage component output satisfies a predefined criterion;

wherein the controller comprises at least one switch, which is configured to supply the second electrical backup to the at least one cascode stage;

wherein the controller is further configured to bypass a first voltage divider stage and/or the second voltage divider stage using the at least one switch, if a voltage which is present at the voltage divider satisfies a predefined criterion; and wherein the second electrical backup potential is different from the first electrical backup potential.

18. A circuit, comprising:

a first cascode stage and a second cascode stage;

a voltage divider which is connected in parallel with the first cascode stage and the second cascode stage and has a first voltage divider stage which is coupled to the first cascode stage, and has a second voltage divider stage which is coupled to the second cascode stage; and a controller which is configured to bypass at least one of the first voltage divider stage or the second voltage divider stage if a voltage which is present at the voltage divider satisfies a predefined criterion;

wherein the controller comprises at least one switch, which is configured to supply the second electrical backup to the at least one cascode stage;

wherein the controller is further configured to bypass a first voltage divider stage and/or the second voltage divider stage using the at least one switch, if a voltage which is present at the voltage divider satisfies a predefined criterion; and wherein the second electrical backup potential is different from the first electrical backup potential.

19. A method of operating a circuit, which circuit comprises a plurality of cascode stages and a voltage divider which is connected in parallel with the plurality of cascode stages and is coupled to the cascode stages in order to make available a first electrical backup potential to at least one cascode stage of the plurality of cascode stages, the method comprising:

coupling at least one cascode stage of the plurality of cascode stages to a predefined backup potential if a voltage which is present at the circuit satisfies a predefined criterion; and otherwise coupling the at least one cascode stage to a backup potential which is divided off from the voltage;

wherein a controller comprises at least one switch, which is configured to supply the second electrical backup to the at least one cascode stage;

wherein the controller is further configured to bypass a first voltage divider stage and/or the second voltage divider stage using the at least one switch, if a voltage which is present at the voltage divider satisfies a predefined criterion; and wherein the second electrical backup potential is different from the first electrical backup potential.

20. A method of operating a circuit, which circuit comprises at least one cascode stage and a voltage divider stage which is connected in parallel with the at least one cascode stage and is coupled to the at least one cascode state in order to make available a first electrical backup potential to at least one cascode state of the plurality of cascode stages, the method comprising:

dividing off a backup potential from a voltage which is present at the circuit, by means of the voltage divider stage;

inputting the backup potential into the at least one cascode stage; and bypassing the voltage divider stage if the voltage satisfies a predefined criterion;

wherein a controller comprises at least one switch, which is configured to supply the second electrical backup to the at least one cascode stage;

wherein the controller is further configured to bypass a first voltage divider stage and/or the second voltage divider stage using the at least one switch, if a voltage which is present at the voltage divider satisfies a predefined criterion; and wherein the second electrical backup potential is different from the first electrical backup potential.

* * * * *

UNITED STATES PATENT AND TRADEMARK OFFICE
CERTIFICATE OF CORRECTION

| | |
|---|---|
| PATENT NO. | : 10,158,285 B2 |
| APPLICATION NO. | : 15/622180 |
| DATED | : December 18, 2018 |
| INVENTOR(S) | : Matthias Emsenhube |

Page 1 of 1

It is certified that error appears in the above-identified patent and that said Letters Patent is hereby corrected as shown below:

On the Title Page

The title item (54) and in the Specification, Column 1, Line 1 appear as follows:
"CIRCUIT AND METHOD FOR OPERATING THE CIRCUIT"

Should be changed to:
-- A Multiple-Cascode-Stage-Circuit with a First and Second Backup Potential --

Signed and Sealed this
Fifth Day of March, 2019

Andrei Iancu
*Director of the United States Patent and Trademark Office*